(12) United States Patent
Vaidya et al.

(10) Patent No.: US 7,797,752 B1
(45) Date of Patent: Sep. 14, 2010

(54) METHOD AND APPARATUS TO SECURE A COMPUTING ENVIRONMENT

(76) Inventors: Vimal Vaidya, 720 Vista Cerro Ter., Fremont, CA (US) 94539; Kurt U. Lennartsson, 984 La Palma Pl., Milpitas, CA (US) 95035; John C. Myung, 6559 Idlebrook Ct., San Jose, CA (US) 95120

( * ) Notice: Subject to any disclaimer, the term of this patent is extended or adjusted under 35 U.S.C. 154(b) by 1046 days.

(21) Appl. No.: 10/739,552

(22) Filed: Dec. 17, 2003

(51) Int. Cl.
*G06F 7/04* (2006.01)
*G06F 17/30* (2006.01)
*H04N 7/16* (2006.01)

(52) U.S. Cl. .................. 726/27; 726/11; 726/13; 726/14; 726/15; 726/23; 726/24; 717/170; 717/172

(58) Field of Classification Search ............... 726/13, 726/14, 15, 23, 24, 27, 11; 717/170, 172
See application file for complete search history.

(56) References Cited

U.S. PATENT DOCUMENTS

| | | | |
|---|---|---|---|
| 5,623,637 A | 4/1997 | Jones et al. | |
| 5,657,390 A * | 8/1997 | Elgamal et al. | 713/151 |
| 5,758,070 A * | 5/1998 | Lawrence | 709/220 |
| 5,845,068 A * | 12/1998 | Winiger | 726/3 |
| 5,941,988 A * | 8/1999 | Bhagwat et al. | 726/12 |
| 6,021,150 A * | 2/2000 | Partio et al. | 372/57 |
| 6,038,320 A | 3/2000 | Miller | |
| 6,131,163 A * | 10/2000 | Wiegel | 726/12 |
| 6,189,099 B1 | 2/2001 | Rallis et al. | |
| 6,279,113 B1 * | 8/2001 | Vaidya | 726/23 |
| 6,304,973 B1 * | 10/2001 | Williams | 726/3 |
| 6,338,141 B1 * | 1/2002 | Wells | 726/24 |
| 6,405,318 B1 * | 6/2002 | Rowland | 726/22 |
| 6,460,141 B1 * | 10/2002 | Olden | 726/4 |
| 6,499,107 B1 * | 12/2002 | Gleichauf et al. | 726/23 |
| 6,557,054 B2 * | 4/2003 | Reisman | 710/33 |
| 6,594,763 B1 * | 7/2003 | Madoukh | 726/1 |
| 6,609,196 B1 * | 8/2003 | Dickinson et al. | 713/154 |
| 6,654,882 B1 * | 11/2003 | Froutan et al. | 713/153 |
| 6,715,084 B2 * | 3/2004 | Aaron et al. | 726/23 |
| 6,715,144 B2 * | 3/2004 | Daynes et al. | 717/174 |

(Continued)

OTHER PUBLICATIONS

William R. Stanek; Microsoft Windows 2000 Administrator's Pocket Consultant; Jan. 12, 2000; Microsoft Press; Chapter 8—Creating User and Group Accounts in Windows 2000.*

(Continued)

*Primary Examiner*—Christian LaForgia
*Assistant Examiner*—James Turchen
(74) *Attorney, Agent, or Firm*—Law Office of Philip A Steiner

(57) ABSTRACT

A method and apparatus for a surround security system is provided. The surround security system is embodied on a computer readable medium and includes a packet enforcement engine to screen packets to and from the network and a TCP/IP stack, an application enforcement engine to screen packets to and from the TCP/IP stack and applications on the computer system, a file monitor to verify integrity of files on the computer system and a vulnerability scanner to ensure that the computer system complies with a set level of security. The surround security system provides security which protects accesses through the TCP/IP stack for applications, and an operating system of the computer system.

25 Claims, 22 Drawing Sheets

U.S. PATENT DOCUMENTS

| | | | |
|---|---|---|---|
| 6,853,988 B1* | 2/2005 | Dickinson et al. | 705/75 |
| 6,895,383 B2* | 5/2005 | Heinrich | 705/7 |
| 6,925,572 B1* | 8/2005 | Amit et al. | 726/15 |
| 6,990,660 B2* | 1/2006 | Moshir et al. | 717/171 |
| 7,024,479 B2* | 4/2006 | Shah et al. | 709/227 |
| 7,032,240 B1 | 4/2006 | Cronce et al. | |
| 7,146,640 B2* | 12/2006 | Goodman et al. | 726/16 |
| 7,178,165 B2* | 2/2007 | Abrams | 726/23 |
| 7,178,166 B1* | 2/2007 | Taylor et al. | 726/25 |
| 7,194,623 B1* | 3/2007 | Proudler et al. | 713/164 |
| 7,197,762 B2* | 3/2007 | Tarquini | 726/3 |
| 7,346,922 B2* | 3/2008 | Miliefsky | 726/3 |
| 7,509,673 B2* | 3/2009 | Swander et al. | 726/11 |
| 2002/0035639 A1* | 3/2002 | Xu | 709/238 |
| 2002/0053032 A1* | 5/2002 | Dowling et al. | 713/201 |
| 2002/0100036 A1* | 7/2002 | Moshir et al. | 717/173 |
| 2002/0108059 A1* | 8/2002 | Canion et al. | 713/201 |
| 2002/0188872 A1 | 12/2002 | Willeby | |
| 2003/0045273 A1* | 3/2003 | Pyhalammi et al. | 455/412 |
| 2003/0087601 A1 | 5/2003 | Agam et al. | |
| 2003/0093281 A1 | 5/2003 | Geilhufe et al. | |
| 2003/0101338 A1* | 5/2003 | Mullen et al. | 713/152 |
| 2003/0120605 A1 | 6/2003 | Fontana et al. | |
| 2003/0167395 A1 | 9/2003 | Chang et al. | |
| 2003/0188189 A1 | 10/2003 | Desai et al. | |
| 2003/0220992 A1* | 11/2003 | DiRico | 709/221 |
| 2003/0229890 A1* | 12/2003 | Lau et al. | 717/168 |
| 2004/0006621 A1* | 1/2004 | Bellinson et al. | 709/225 |
| 2004/0010712 A1* | 1/2004 | Hui et al. | 713/201 |
| 2004/0073701 A1* | 4/2004 | Huang et al. | 709/240 |
| 2004/0073726 A1 | 4/2004 | Margalit et al. | |
| 2004/0083305 A1* | 4/2004 | Wang et al. | 709/240 |
| 2004/0107416 A1* | 6/2004 | Buban et al. | 717/170 |
| 2004/0143749 A1* | 7/2004 | Tajalli et al. | 713/200 |
| 2004/0187012 A1 | 9/2004 | Kohiyama et al. | |
| 2004/0187018 A1 | 9/2004 | Owen et al. | |
| 2004/0268149 A1* | 12/2004 | Aaron | 713/201 |
| 2005/0102529 A1 | 5/2005 | Buddhikot et al. | |
| 2005/0138416 A1* | 6/2005 | Qian et al. | 713/201 |
| 2005/0273858 A1* | 12/2005 | Zadok et al. | 726/24 |
| 2006/0010325 A1 | 1/2006 | Liu et al. | |
| 2006/0015728 A1 | 1/2006 | Ballinger et al. | |

OTHER PUBLICATIONS

Securing the Perimeter, Part 1; May 16, 2001; Symantec Corporation.*
Wells, Mark & Thrower, Wood; Defend Your Enterprise With Layered Security; Jun. 14, 2001; Symantec Corporation.*
Symantec Enterprise Security Manager 5.5; Dec. 12, 2001; Symantec Corporation.*
Symantec AntiVirus Solution 7.5 Tour Part 1: Symantec System Center; Jul. 10, 2001; Symantec Corporation.*
Symantec AntiVirus Corporate Edition User Manual; Jul. 2, 2002; Symantec Corporation; pp. 29-35.*
AXENT(R)/ESM User Manual Version 5.1; Oct. 25, 2001; Symantec Corporation; Section 1.5.*
Symantec AntiVirus Corporate Edition Administrator's Guide; Jul. 2, 2002; Symantec Corporation; p. 52 and 53.*
Ferguson, Paul & Huston, Geoff; What is a VPN?; Apr. 1998.*
News Release: Symantec Announces Norton Utilities for Windows NT 4.0; Jan. 27, 1997; Symantec Corporation.*
Ed Skoudis, Counter Hack: A Step-by-Step Guide to Computer Attacks and Effective Defenses; Jul. 23, 2001; Prentice Hall PTR, pp. 44-57, 139-140, 226-237, 248-251, 379, 432-433.*
"Micro Vault with Fingerprint Access," Sony Global—Micro Vault, pp. 1-4.
"Keys That Remember—and a Lot More," BusinessWeek/online, Dec. 22, 2003, pp. 1-2.
The CryptoStick™, http://www.rtsz.com/cryptostick.shtml.
"You Can Lug Home Your Office Computer Inside Your Pocket," The Wall Street Journal, online, Nov. 20, 2003, pp. 1-3.
"USB VPN & Firewall Adapter," Linksys, a Division of Cisco Systems, Inc., 2003, pp. 1-3.
"KeyComputing—Mobility that Works," M-Systems, 2003, pp. 1-4.
"Xkey Delivers Mobile Access on Your Key Ring," Channel: Content and Collaboration (Archive), Jan. 15, 2004 p. 1 of 1.
"Micro Vault with Fingerprint Access," Sony Global—Micro Vault, pp. 1-4.
Keys That Rember—and a Lot More, BusinessWeek/online, pp. 1-2, Dec. 22, 2003.
The CyrptoStickTM, http://www.rtsz.com/cryptostick.shtml.
You Can Lug Home Your Office Computer Inside Your Pocket, The Wall Street Journal, online, pp. 1-3, Nov. 20, 2003.
"USB VPN & Firewall Adapter," LINKSYS, a Division of Cisco Systems, Inc., pp. 1-3, 2003.
"KeyComputing—Mobility that Works," M-Systems, pp. 1-4, 2003.
"Xkey Delivers Mobile Access on Your Key Ring," Channel: Content and Collaboration (Archive), p. 1 of 1, Jan. 15, 2004.
"U3 Platform," downloaded from www u3 corn/platform/default aso on Oct. 27, 2006.
"TCG EFI Platform—for TPM Family 1.1 or 1.2," pp. 1-37, Jun. 2006.
"TCG EFI Protocol—for TMP Family 1.1 or 1.2," pp. 1-18, Jun. 2006.
Stanek, William R., "Microsoft Windows 2000 Administrator's Pocket Consultant," Microsoft Press, Chapter 8—Creating User and Group Accounts in Windows 2000, Jan. 12, 2000.
Securing the Perimeter, Part 1, Symantec Corporation, May 16, 2001.
Wells, Mark, et al, "Defend Your Enterprise With Layered Security," Symantec Corporation, Jun. 14, 2001.
Symantec Enterprise Security Manager 5.5, Symantec Corporation, Dec. 12, 2001.
Symantec AntiVirus Solution 7.5 Tour Part 1, Symantec System Center, Symantec Corporation, Jul. 10, 2001.
Symantec AntiVirus Corporate Edition User Manual, "Symantec AntiVirus Corporate Edition and Realtime Protection," Symantec Corporation, Jul. 2, 2002, pp. 29-35.
AXENT(R)/ESM User Manual Version 5.1, Symantec Corporation, Section 1.5, Oct. 25, 2001.
Symantec AntiVirus Corporate Edition Administrator's Guide, Symantec Corporation, Jul. 2, 2002, pp. 52-53.
Ferguson, Paul, et al., "What is VPN?", April 1998.
News Release: Symantec Announces Norton Utilities for Windows NT 4.0, Symantec Corporation, Jan. 27, 1997.
Office action Oct. 27, 2007.
Applicant's reply to office action of Oct. 27, 2007.
Office action (Restriction Requirement) Dec. 29, 2008.
Applicant's reply to office action of Dec. 29, 2008 (Election).
Office action May 12, 2009.
Applicant's reply to office action of May 12, 2009.
US H1994, 02/2001, Cheswick et al. (withdrawn)

* cited by examiner

METHOD AND APPARATUS TO SECURE A COMPUTING ENVIRONMENT

FIELD OF THE INVENTION

The present invention relates to computer security, and more specifically to providing complete security architecture.

BACKGROUND

Computer systems are threatened by external dangers, such as viruses, worms, and other malicious computer programs. FIG. 1 illustrates a block diagram of the software portions of a computer system, including end point vulnerabilities. The elements 110 typically reside in the operating system or in applications installed on a machine. The operating system and other resources 120 and the Internet applications 130 interface to the outside world through the TCP/IP stack 140.

A malicious individual or program can access the operating system or other resources 120, through the TCP/IP stack 140. Vulnerabilities in the operating system can enable others to obtain confidential information from the computer system, or use the computer system to attack other systems.

Traditional firewall applications 150 are an interface between the TCP/IP stack and the outside world. They attempt to prevent unauthorized access to the computer system. However, they do not address all of the threats that endanger computer systems.

SUMMARY OF THE INVENTION

A method and apparatus for providing a security architecture is described. The security architecture, in one embodiment, the security architecture surrounds the TCP/IP stack, to ensure the integrity of the computer system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for securing a computer system is described. The types of attacks the a computer system may suffer through its network, may attack vulnerabilities in the operating system, in various applications, in the security implementation on the computer system, and on the TCP/IP stack itself. For example, the operating system may have a known exploit, which can be fixed with a patch (a small application designed to correct a vulnerability or remove the availability of an exploit).

However, users often fail to apply the current patches to their operating system and applications. Additionally, users will often select a password that is trivially obtainable, such as their name, the word "password" or similar easily guessed passwords. Traditional security, such as a firewall, does not verify the adequacy of such security implementations. The current application provides a surround architecture security structure, in which all available vulnerabilities of a computer system are protected.

Figure 1:
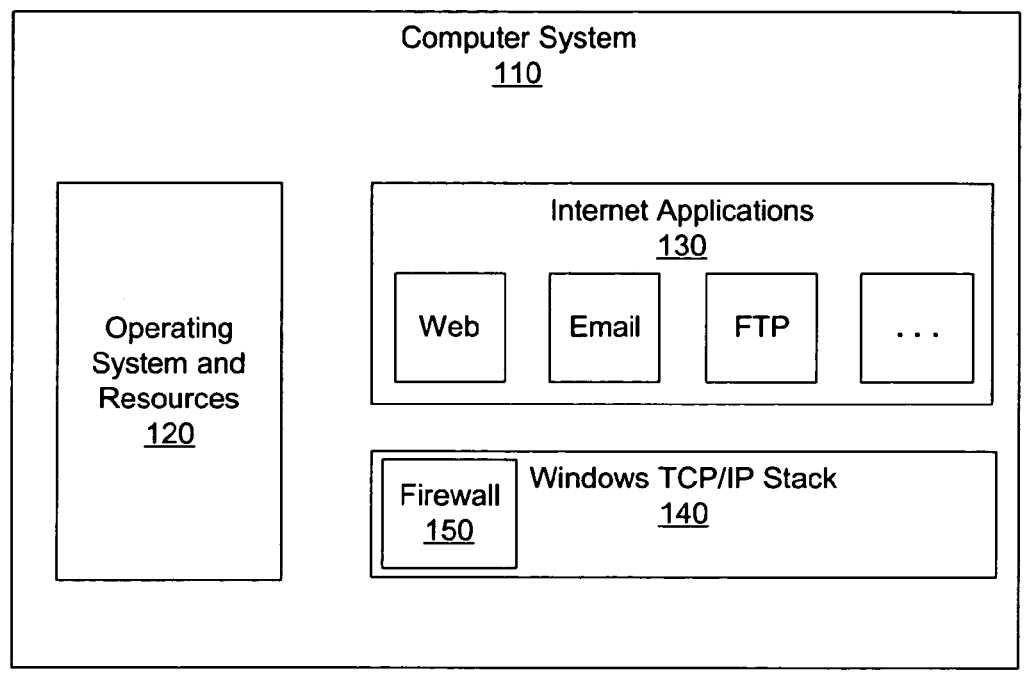
FIG. 1 is a block diagram of a prior art computer system including end point vulnerabilities.
Figure 2A:
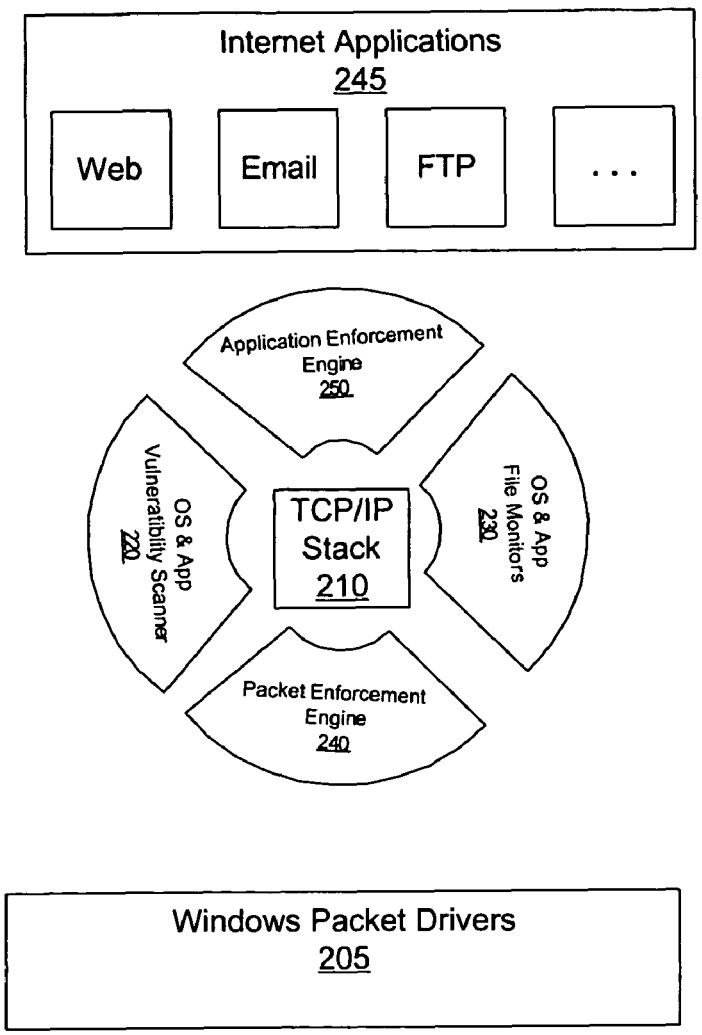
FIG. 2A is a block diagram of one embodiment of the security architecture in accordance with the present invention.

FIG. 2A is a block diagram of one embodiment of the surround security architecture in accordance with the present invention. The TCP/IP stack 210 is surrounded by the elements 220, 230, 240, 250 of the security architecture. In one embodiment, these elements 220, 230, 240, 250 may be implemented as separate software components. In another embodiment, the elements 220, 230, 240, 250 may be implemented as a single software application.

The vulnerability scanner 220 periodically checks whether patches have been released for the applications and operating system running on the computer system. In one embodiment, the vulnerability scanner 220 also verifies that the system settings provide a level of security that complies with the preset security levels. Thus, the vulnerability scanner 220 protects the operating system and application from threats based on settings and known exploits that have patches available.

The file monitor 230 monitors the integrity of the various files, including executables and (DLLs). The file monitor 230, in one embodiment, also monitors system usage, to verify that usage is commensurate with the legitimate applications that are running.

The packet enforcement engine 240 resides between the network and the TCP/IP stack 210, and determines which packets are routed through to the TCP/IP stack, and which are discarded. In on embodiment, the packet enforcement engine 240 handles encrypted packets as well, and includes a packet decryption ability, to enable the packet enforcement engine 240 to correctly route or discard virtual private network (VPN) and other encrypted packets.

The application enforcement engine 250 resides between the TCP/IP stack 210 and the applications 245 on the computer system. The application enforcement engine 250 routes the packets to the appropriate protective layer, to ensure that only "safe" packets are routed to the applications.

In this way, the surround security architecture surrounds the TCP/IP stack 210 and shields the computer system from attacks at all levels. By providing a single integrated system, the protection is complete, and there is no repetition or overlap in the services provided. This ensures that the time overhead is minimized.

Figure 2B:
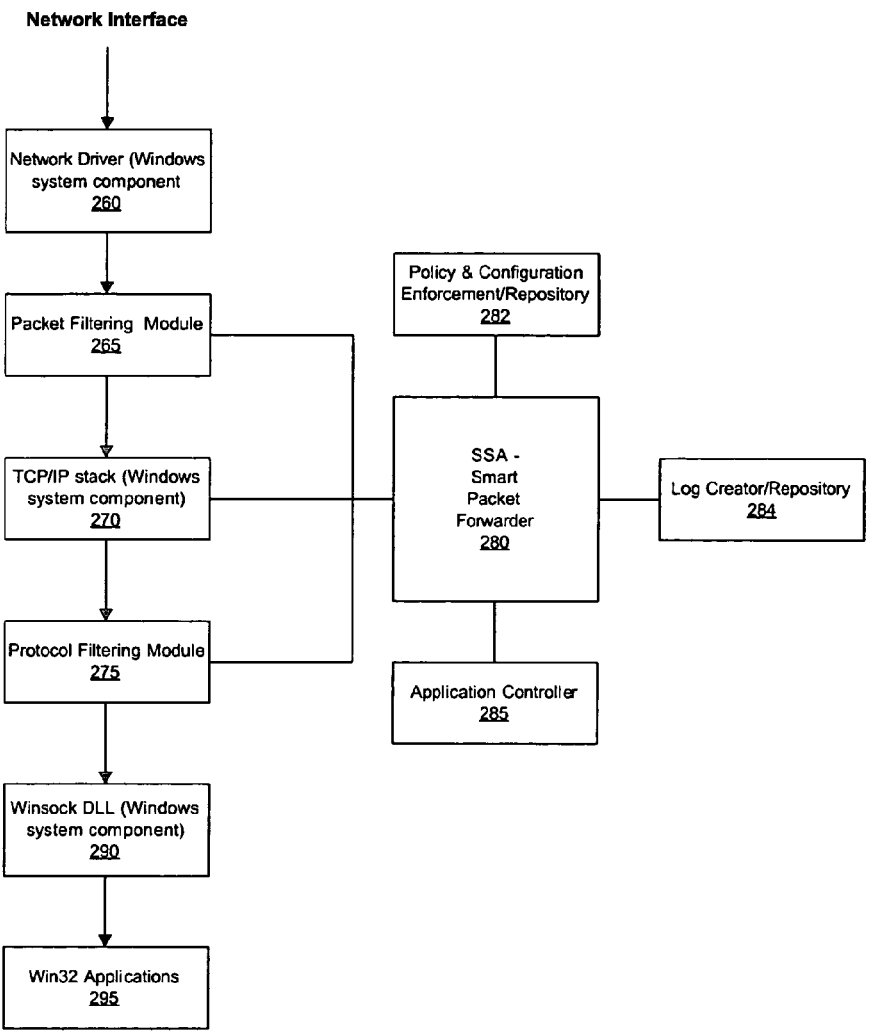
FIG. 2B is a block diagram of an alternative embodiment of the security architecture in accordance with the present invention.

FIG. 2B illustrates an alternative method of looking at the surround security architecture. The network interface connects to network driver 260. In one embodiment, if the operating system is a windows operating system, the network driver is a system component, i.e. not part of the surround security system.

The packet filtering module 265 receives packets from the network driver 260, and filters out "unacceptable" packets, as will be described below. The remaining packets are passed to the TCP/IP stack 270. Generally, the TCP/IP 270 stack is part of the operating system.

The packets are then sent to the protocol filtering module 275, which rejects those packets that do not meet the requirements. The protocol filtering module 275, TCP/IP stack 270, and packet filtering module 265, use smart packet forwarder 280 to forward the subset of packets that are acceptable to be passed to the next stage. In one embodiment, application controller 285 is connected to the packet forwarder 280, to perform correlation based on the events received from the Packet and Protocol filtering modules and program the application controller to prohibit certain applications from running.

The Winsock DLL 290, if the system is using a Windows operating system, forwards the packets to the appropriate applications 295. The processes described are discussed in more detail below.

Figure 3:
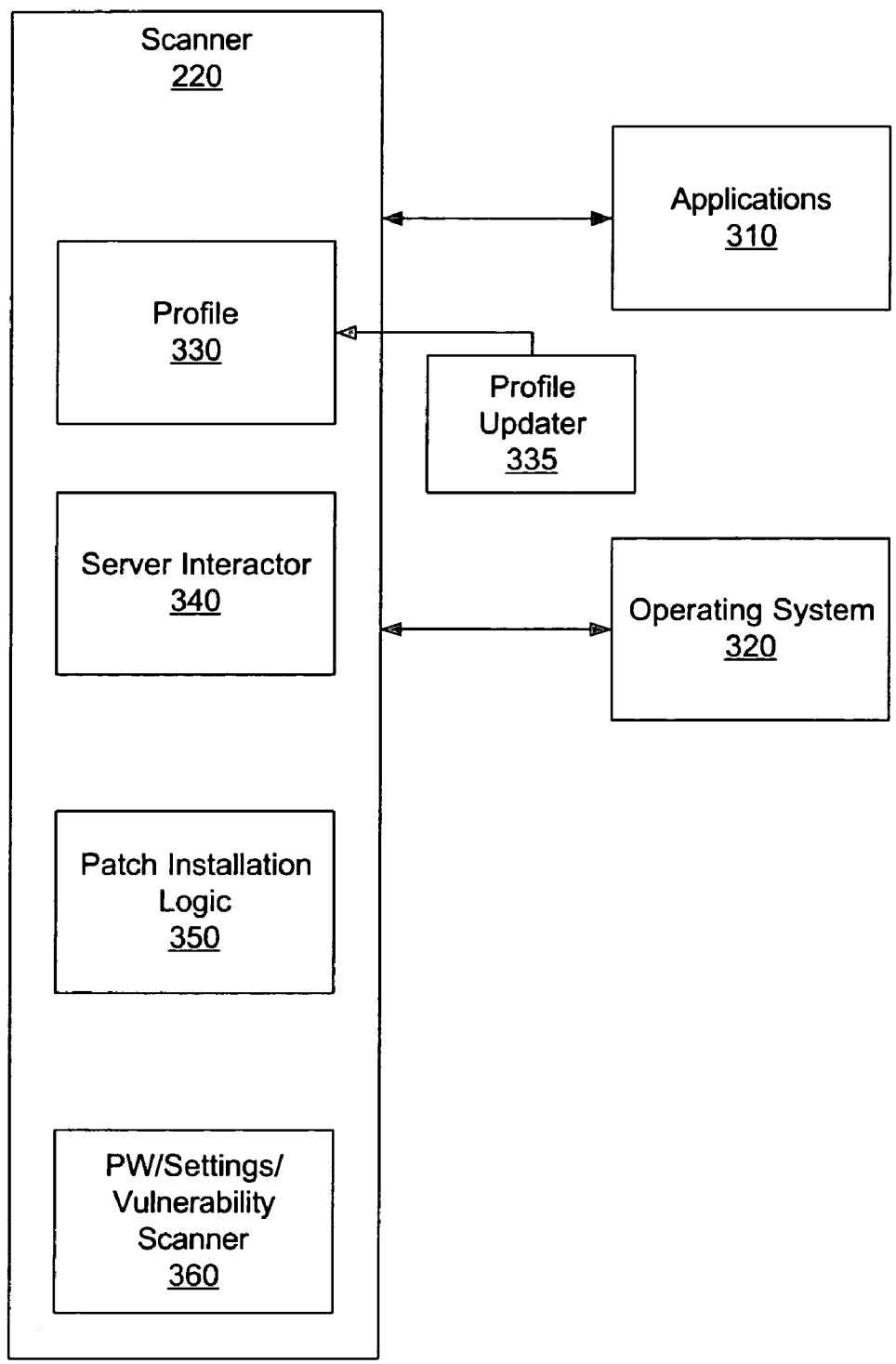
FIG. 3 is a block diagram of one embodiment of the vulnerability scanner of the security architecture.

FIG. 3 is a block diagram of one embodiment of the vulnerability scanner of the security architecture. The vulnerability scanner 220 includes a computer profile 330. The computer profile 330 identifies the operating system 320 and applications 310 resident on the computer system. In one embodiment, the profile 330 includes a type and version number for each application 310 and for the operating system 320. In one embodiment, the profile 330 is updated by profile updater 335, whenever a new application is installed on the computer system.

Server interaction logic 340 interacts with the server, periodically. In one embodiment, server interaction logic 340 is initiated periodically, such as once a week, or once a month. Alternatively, in one embodiment, the user may set the frequency of the interactions. In another embodiment, the interaction is initiated directly by the user. In another embodiment, every time the system is rebooted, the interaction is initiated. The interaction sends the profile 330 to the server, and receives any applicable patches to the operating system and applications. In one embodiment, the patches themselves are not sent to the system. Rather, links to the applicable patches are provided.

Patch installer 350 downloads and installs patches. In one embodiment, patch installer 350 automatically installs any downloaded patches. In another embodiment, the patch installer 350 indicates to the user that update patches are available, and should be installed. The patch installer 350 also initiates the profile updater 335, to update the profile 330, when a patch is installed.

Settings vulnerability identifier 360 ensures that the user is using a level of security that is acceptable. For example, the settings vulnerability identifier 360 may require that the password for accessing the system be at least 5 characters, and not be any standard dictionary word. Similarly, the settings vulnerability identifier 360 may require that an application such as Outlook be set to not open attachments automatically.

In one embodiment, the settings preferences may be modified for the settings vulnerability identifier 360. In one embodiment, such changes to the settings may be made only by an administrator.

Figure 4A:
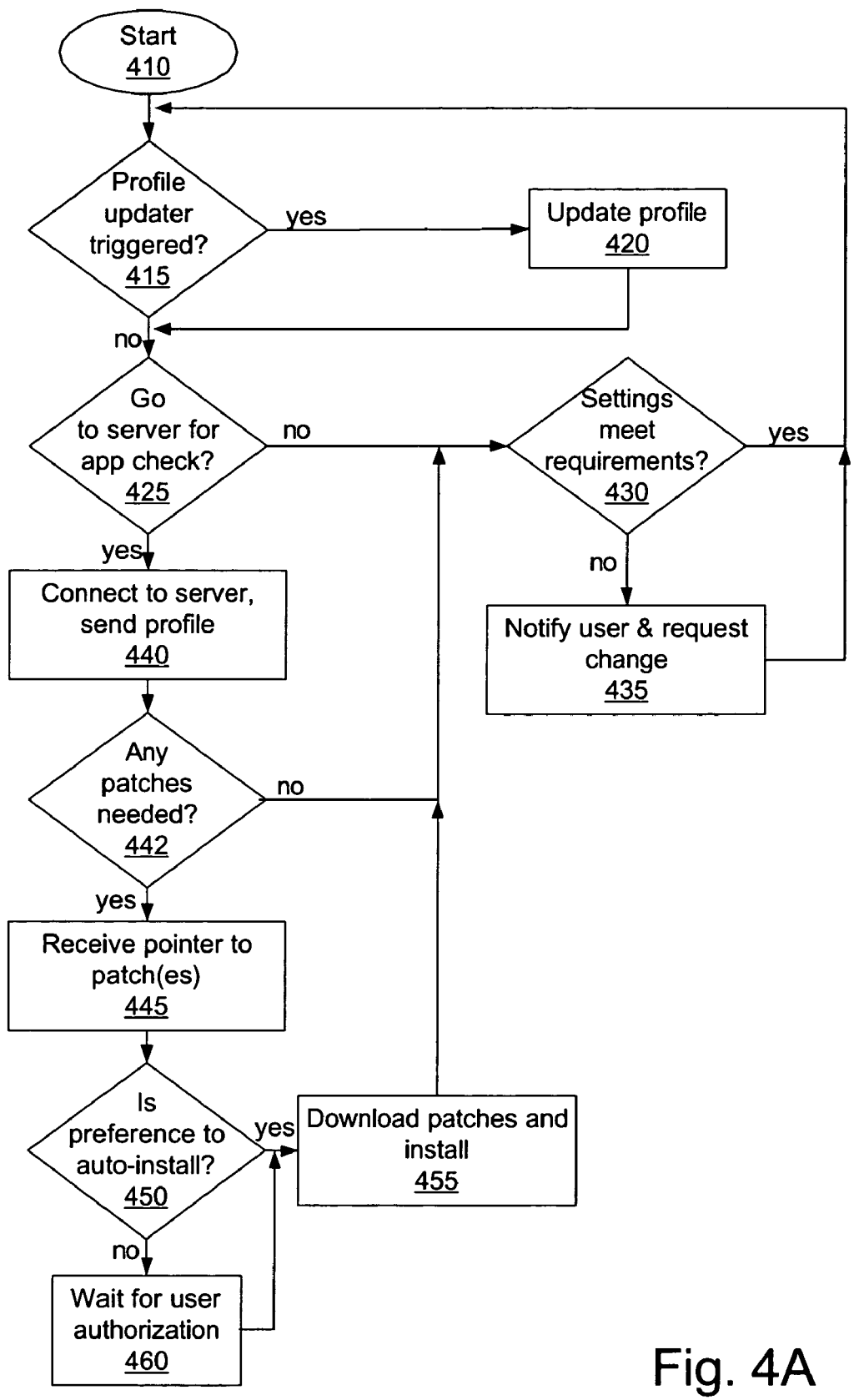
FIG. 4A is a flowchart of one embodiment of the operation of the vulnerability scanner.

FIG. 4 is a flowchart of one embodiment of the operation of the vulnerability scanner. The process starts at block 410. At block 415, the process determines whether the profile updater has been triggered. The profile updater may be triggered by various activities on the system, such as: installing new software, patching/upgrading an existing application, installing new hardware, etc. In one embodiment, the profile updater is triggered automatically periodically to scan for changes in the system. If the profile updater is triggered, at block 420, the profile is updated by the profile updater. The process then continues to block 425.

If the profile updater is not triggered, the process continues directly to block 425.

At block 425, the system determines whether it is time to determine whether there are any needed updates. In one embodiment, the updater is triggered whenever the profile is updated. In another embodiment, the updater is triggered periodically, i.e. every week. In yet another embodiment, the updating is triggered every time the computer is booted, or on a similarly regular schedule. In another embodiment, the updater is triggered whenever the system is coupled to a network and has bandwidth. If the process determines that it is time to update, the process continues to block 440.

If it is not yet time to check for updates, the process continues to block 430. At block 430, the process scans the settings of the computer, to ensure that the settings meet the requirements for the system. For example, the system administrator may require that a password be at least 8 characters long, and not be a dictionary word. The settings scanner determines whether these requirements are met. If they are met, the process returns to block 410.

If the settings do not meet the requirements, the process continues to block 435. At block 435, the user is notified that the settings are below the thresholds set for the system, and is requested to change their settings. In one embodiment, the process then does not permit use of the computer until the settings have been altered. The process then continues to block 410, to restart the process.

If, at block 425, the process determined that it was time to interact with the server and determine if new updates should be downloaded, the process continued to block 440.

At block 440, the process connects to the server, using the profiles, and determines at block 442 whether any patches or updates should be downloaded. If no patches or updates are needed, the process returns to block 430, to determine whether the settings meet requirements.

If one or more patches are needed, the system receives, at block 445, pointers to the patches, and downloads the patches from those locations.

At block 450, the process determines whether the preferences set that the patches should be automatically installed. If automatic installation is not set, the process, at block 460, waits until the user has authorized the installation of the patch, and then continues to block 455, to download and install the patches.

If auto-installation is enabled, the process continues directly to block 455, and installs the patches onto the system. The process then returns to block 430, to check on the settings of the system.

Figure 4B:
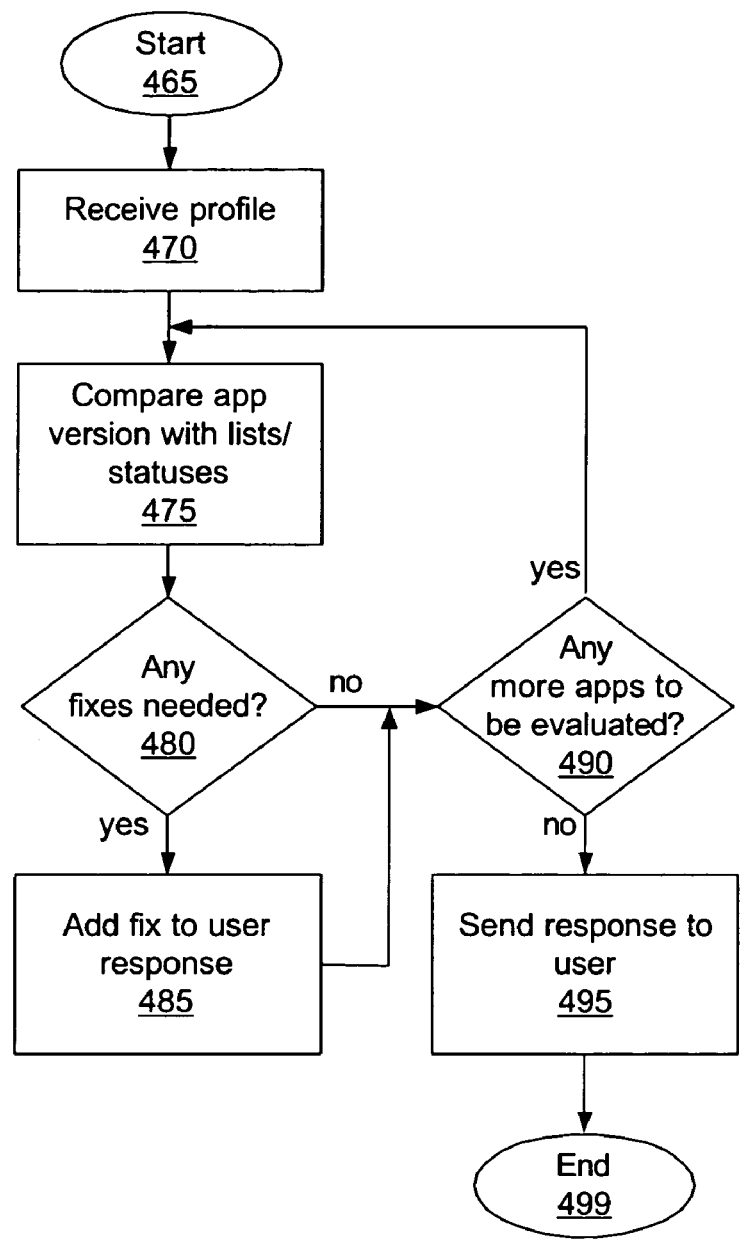
FIG. 4B is a flowchart of one embodiment of the operation from the server's perspective.

FIG. 4B is a flowchart of one embodiment of the server-side of the above described process. The process starts at block 465. At block 470, the server receives a profile for a user's system. In one embodiment, the profile is sent encrypted, in order to preserve user confidentially. In one embodiment, the profile is sent with a user identifier that does not enable the server administrator to determine the identity of the particular user. This ensures that the user's privacy is maintained. In another embodiment, the server may be inside a corporation. In that instance, the system administrator may wish to know the identity of the users whose systems are being updated. In that case, this privacy feature may be turned off.

At block 475, the server compares an application profile with the current most-up-to-date set of patches for the particular application. At block 480, the process determines whether the application profile indicates that one or more patches have not yet been installed, or if there has been a report of another problem with the application. For example, a user may inadvertently install spyware, or a malicious user may install a key logger or similar application onto the user's system. In one embodiment, at block 480, the server also determines whether the application is in a list of "dangerous" applications, or if the application requires a patch (i.e. is an accepted application which should be upgraded because of security of functionality issues.) If the application does not have any issues, the process continues to block 490.

If the application needs to be upgraded, the server prepares a response to the user, at block 485, and adds the link to a patch, or an "uninstall application" link to the response. The process then continues to block 490.

At block 490, the process determines whether there are any more applications to evaluate. If so, the process returns to block 475. Otherwise, the process, at block 495, sends the response to the user, with the list of patches, updates, uninstalls, and other actions to keep the user's system up-to-date. The process then terminates at block 499.

Figure 5:
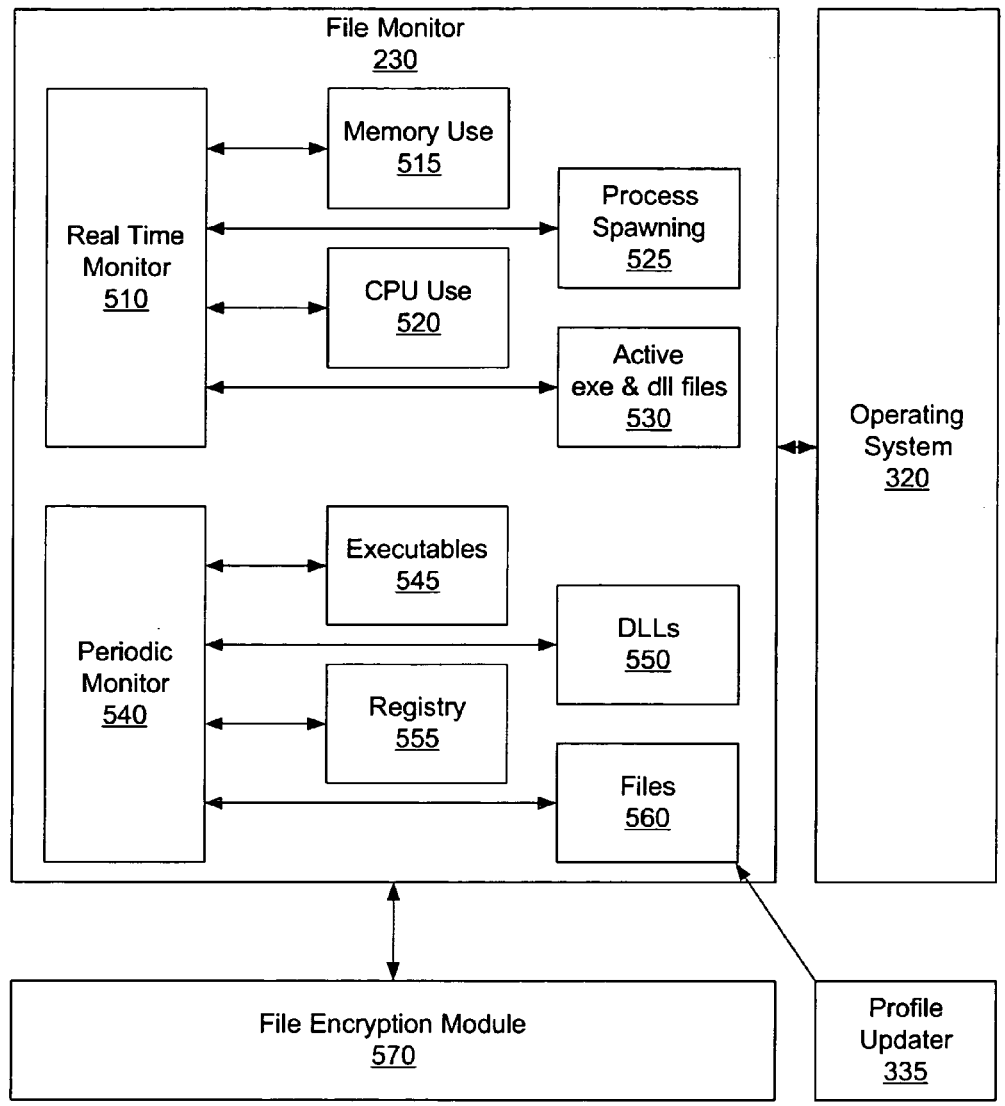
FIG. 5 is a block diagram of one embodiment of the monitor of the security architecture.

FIG. 5 is a block diagram of one embodiment of the monitor of the security architecture. The monitor 230 includes a real time monitor 510 and a periodic monitor 540.

The real-time monitor 510 constantly monitors memory usage 515, CPU usage 520, process spawning 525, executables and DLLs 530, and any other relevant processes, threads, or characteristics that may be monitored. In one embodiment, the real-time monitor 510 couples to the existing tracking mechanism within the computer system to obtain this information. In another embodiment, the real-time monitor 510 may obtain this information directly.

The real-time monitor 510 then ensures that only "legitimate applications" are spawning processes, using CPU time, etc. In one embodiment, the real-time monitor 510 includes a list of possible viral processes, to ensure that none of them are active on the system. In one embodiment, vulnerability scanner 220, when it connects to the server, receives an updated list of possible viral processes.

The periodic monitor 540 periodically monitors the executables 545, DLLs 550, Windows Registry items 555, and files 560 which are resident on the computer system. The periodic monitor 540 ensures that only legitimate files can be uploaded to the computer system. In one embodiment, the periodic monitor may be set to remove or disable inappropriate files, such as games on a work computer. In one embodiment, the periodic monitor 540 includes a connection to profile updater 335, indicating which new applications have been installed on the computer system.

The monitor 230 also includes, in one embodiment, a file encryption module 570. The file encryption module 570 enables the user to add additional protection for critical files or applications, using encryption. The use of encryption is well known in the art.

Figure 6A:
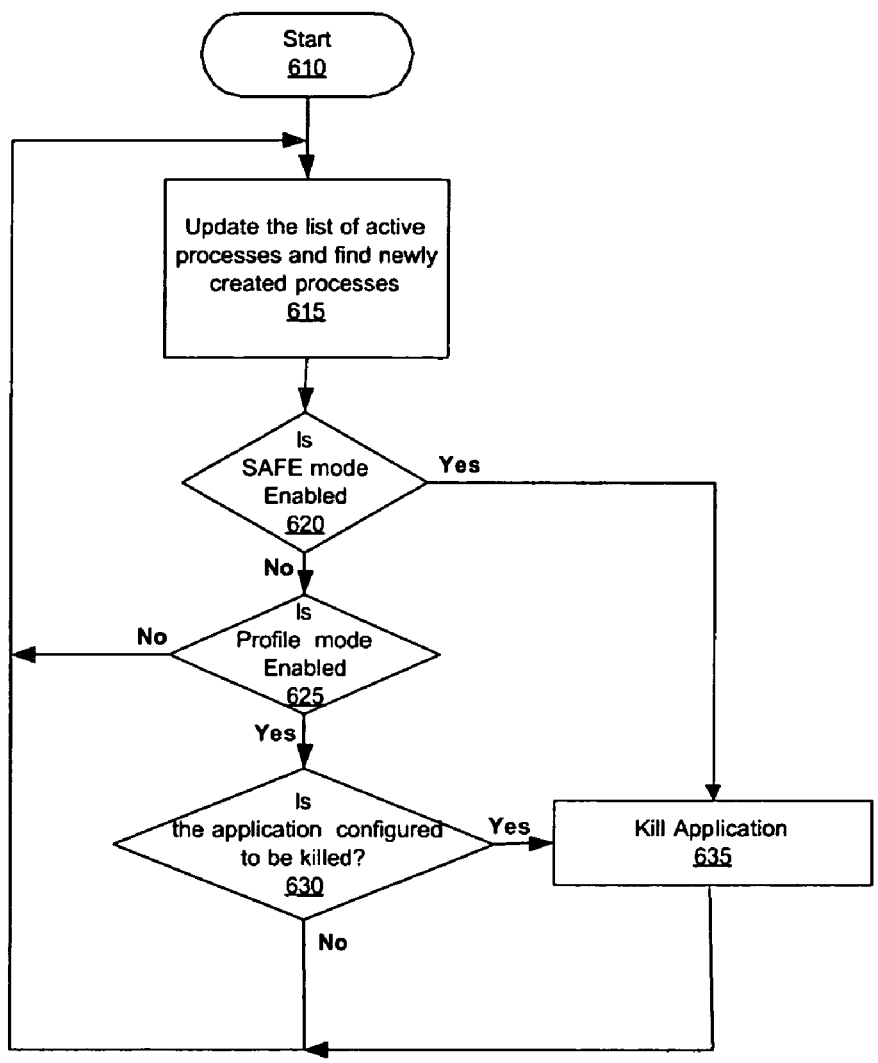
FIG. 6A is a flowchart of one embodiment of the operation of the real time scanner.

FIG. 6A is a flowchart of one embodiment of the operation of the real time scanner. The process starts at block 610. At block 615, the list of active processes is updated, and any newly created processes are identified. Processes are threads spawned by any active application running on a computer system. In one embodiment, the process list is received through the operating system. In another embodiment, the system directly scans, in order to avoid the risk of a potentially compromised operating system providing false information.

At block 620, the process determines whether SAFE mode is enabled. SAFE mode restricts the computer system, to disable any new processes from being started. If SAFE mode is enabled, the process directly continues to block 635, and kills the newly spawned processes. In one embodiment, the application associated with the process is identified, and the application is killed. Killing processes without properly closing the application may cause instability in the system. Therefore, generally, the system closes down the application entirely, when a process is deemed unacceptable.

If SAFE mode is not on, the process, at block 625, determines whether profile mode is enabled. Profile mode limits the applications that may be run on the system. If profile mode is not enabled, the process continues to block 615, to continue monitoring the system.

If profile mode is enabled, the process continues to block 630. At block 630, the process determines whether the application is configured to be killed. In one embodiment, the applications that may be active on a system are preset by a system administrator or by the user. If the application associated with the newly created/active processes are not configured to be killed, the process returns to block 615, to continue monitoring.

Figure 6B:
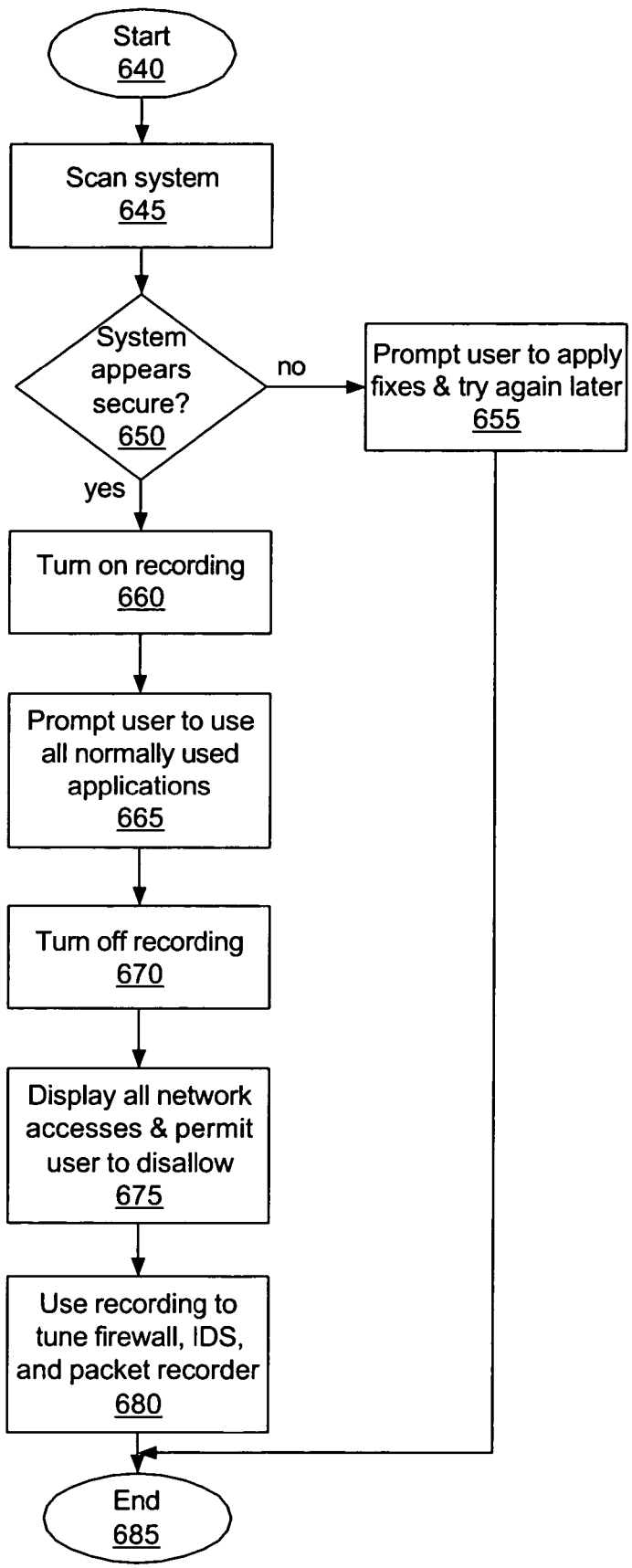
FIG. 6B illustrates one embodiment of setting up a use profile.

FIG. 6B illustrates one embodiment of setting up a use profile that lists all applications that may be active on the system. If an unrecognized application is run on a system that has profile mode enabled, at block 630, the process determines that the application is configured to be killed. Then, at block 635, the application is killed. The process then returns to block 615, to continue monitoring.

FIG. 6B illustrates one embodiment of setting up a use profile. The process starts at block 640. At block 645, the process performs an initial scan. At block 650, the process determines whether the system appears secure. In one embodiment, the process scans for known bad programs, viruses, spyware, or any other applications/processes that may be surreptitiously running on the system. If the system does not appear to be secure, the process at block 655 prompts user to fix the system, and try again later. In one embodiment, the system may permit the user to simply select "kill all applications/processes/threads and apply updates" automatically, and then restarts the scan at block 645.

If the system appears secure, at block 650, the process continues to block 660. At block 660, recording is turned on.

Recording is a process by which the surround security system monitors all newly spawned threads, processes, activated DLLs, running applications, and other aspects associated with the system as it is being used.

At block 665, the user is prompted to use all normally used applications. In one embodiment, the recording process may be over multiple days. In another embodiment, this process is only on for a few minutes. In another embodiment, the recording runs until the user turns off recording. In one embodiment, there is a visual indication that the recording is active. This is to remind the user to use all acceptable applications. At block 670, the recording is ended. As noted above, this may be automatic or may be manually executed by the user.

At block 675, the processes and associated network accesses are displayed to the user. The user is then able to disallow any applications or network accesses, as preferred. For example, the user may be unaware that one of the "permitted" applications reports back over the network. The user may chose to disable the application, or disallow network accesses by the application. In another embodiment, this step may be skipped. In another embodiment, the display may be made to a system administrator, who is better able to evaluate the results of the recording.

At block 680, the recording is used to tune the system. In one embodiment, the tuning may include tuning the firewall, IDS, packet recorder, and real time monitor. This ensures that only those applications considered acceptable are provided network access.

Figure 7:
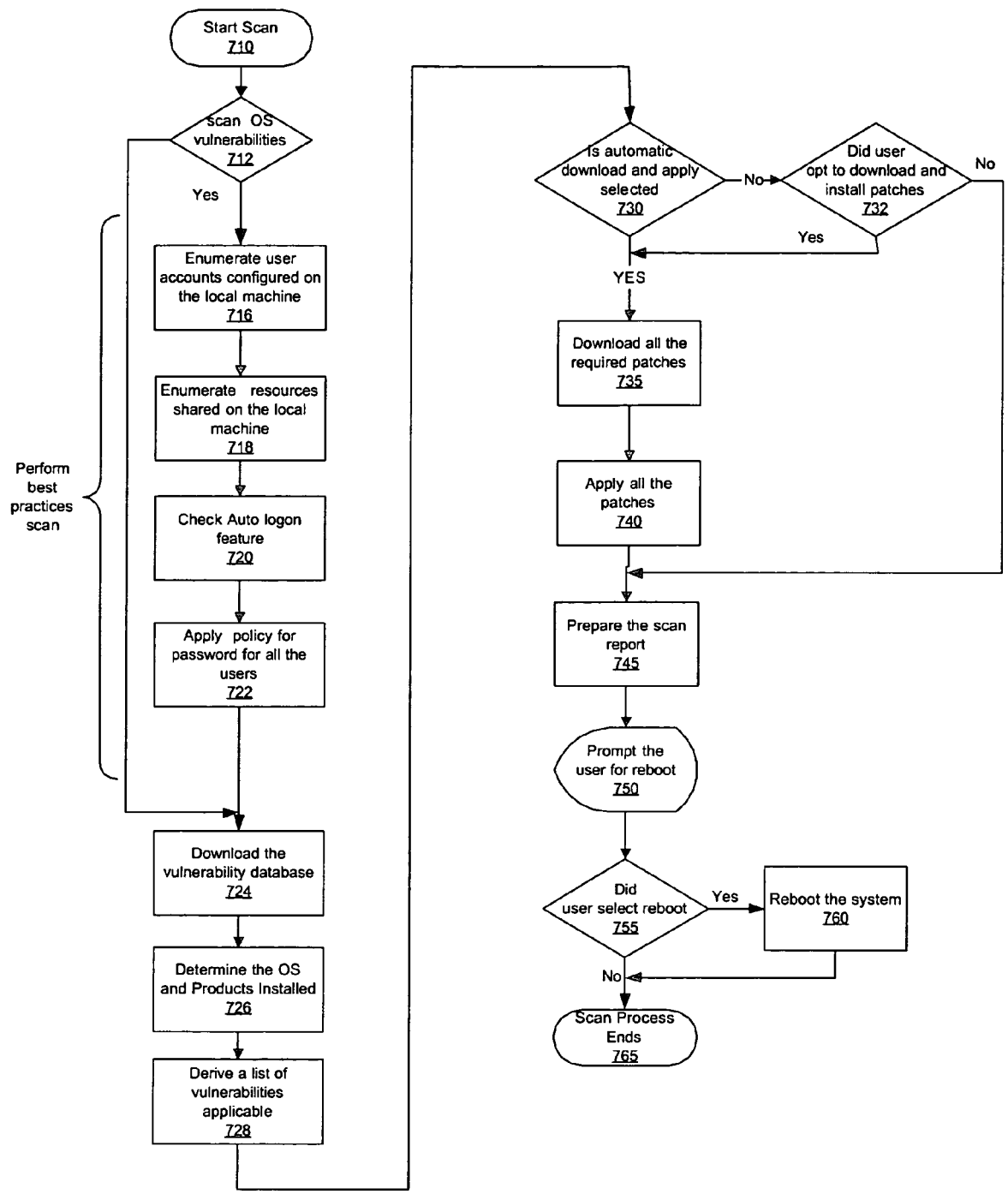
FIG. 7 is a flowchart of one embodiment of the operation of the periodic scanner.

FIG. 7 is a flowchart of one embodiment of the operation of the periodic scanner. The process starts at block 710, when the scan is initiated. As discussed above, the scan may be initiated periodically, when a new application is installed, when a computer system is connected to a network, or at any other interval.

At block 712, the process determines whether operating system vulnerabilities should be scanned. In one embodiment the decision is on what to scan and the intervals between scanning is determined by the user by selecting options and selecting the frequency of the scans. In another embodiment the process will detect user change of password and will in addition initiate a scan when new attack signatures for intrusion detection system become available.

If OS vulnerabilities are not to be scanned, the process continues directly to block 724. If OS vulnerabilities are to be scanned, the process continues to block 716 to perform a best practices scan.

At block 716, the user accounts configured on the local system are enumerated.

At block 718, the resources shared on the local machine are enumerated.

At block 720, the process tests whether the auto log-on feature is enabled. The auto log-on feature enables anyone who uses the same computer system to log-on without knowing the password. This is insecure, since the physical system is rarely secured properly.

At block 722, the policy for passwords is applied for all users. In one embodiment, the policy may be defined by a system administrator. The policy may require: passwords of a certain length, passwords that are not proper words in English, passwords that are not in a "global" dictionary that may include languages other than English, passwords that are the user's name or user's spouse's name, or other easily guessed passwords. In one embodiment, the password policy may further include changing policy, which forces each user to regularly update his or her passwords.

The above blocks comprise the best practices vulnerability scan. In one embodiment, after the operating system vulnerability scan is performed, the process then performs the version scan for security on applications running on the operating system.

At block 724, a vulnerability database is downloaded. The vulnerability database, in one embodiment, is a database provided by the software vendor, such as the MSSecure file provided by Microsoft Corporation. In one embodiment, multiple databases are downloaded.

At block 726, the process determines which version of the operating system and products are installed on the computer system.

At block 728, by comparing the list of active applications and operating system versions with the vulnerability database, a list of actual vulnerabilities applicable to the system are derived.

At block 730, the process determines if automatic download and application of the patches is selected. If so, the process continues to block 735. Otherwise, the process continues to block 732.

At block 732, the process determines whether the user has opted to download and install patches. In one embodiment, the user may select a subset of the patches to be installed. If the user elects to install one or more patches, the process continues to block 735. Otherwise, the process continues to block 745, to prepare a scan report without actually installing any patches.

At block 735, the required patches are downloaded. In one embodiment, the system provides a URL to download patches directly from the manufacturer of the program. Thus, downloading the patches, in one embodiment, comprises going to one or more predefined URLs provided by the manufacturer of each of the applications that require patches, and downloading the patches.

At block 740, the patches are applied. In one embodiment, the patches are applied in a hierarchical order. That is, the patches are applied to the operating system first, then to first tier applications, etc.

At block 745, a scan report is prepared. The scan report lists all of the applications that were tested, and the patches that were applied.

At block 750, the system prompts the user to reboot the computer, if any patches were installed. In one embodiment, the system may cause the computer to automatically reboot.

At block 755, if the reboot is not automatic, the process determines whether the user selected reboot. If so, the system is rebooted at block 760. The process then ends at bock 765.

The periodic scanner has a variable scanning interval. The interval, in one embodiment, has a default setting of XXX. However, an administrator may alter the interval. In one embodiment, a user may also alter the interval for scanning. In one embodiment, the interval for scanning defines a "next scan" based the "date and time of last scan" information. In one embodiment, the "next scan" is defined as a date and time. When the date and time is reached, the periodic scanner is automatically initiated. In one embodiment, the periodic scanner may be delayed temporarily by a user, for example if the user is in the middle of a complex process, and needs the processing power otherwise diverted to the scanner. Once the scan is initiated, the process described above is followed.

Figure 8:
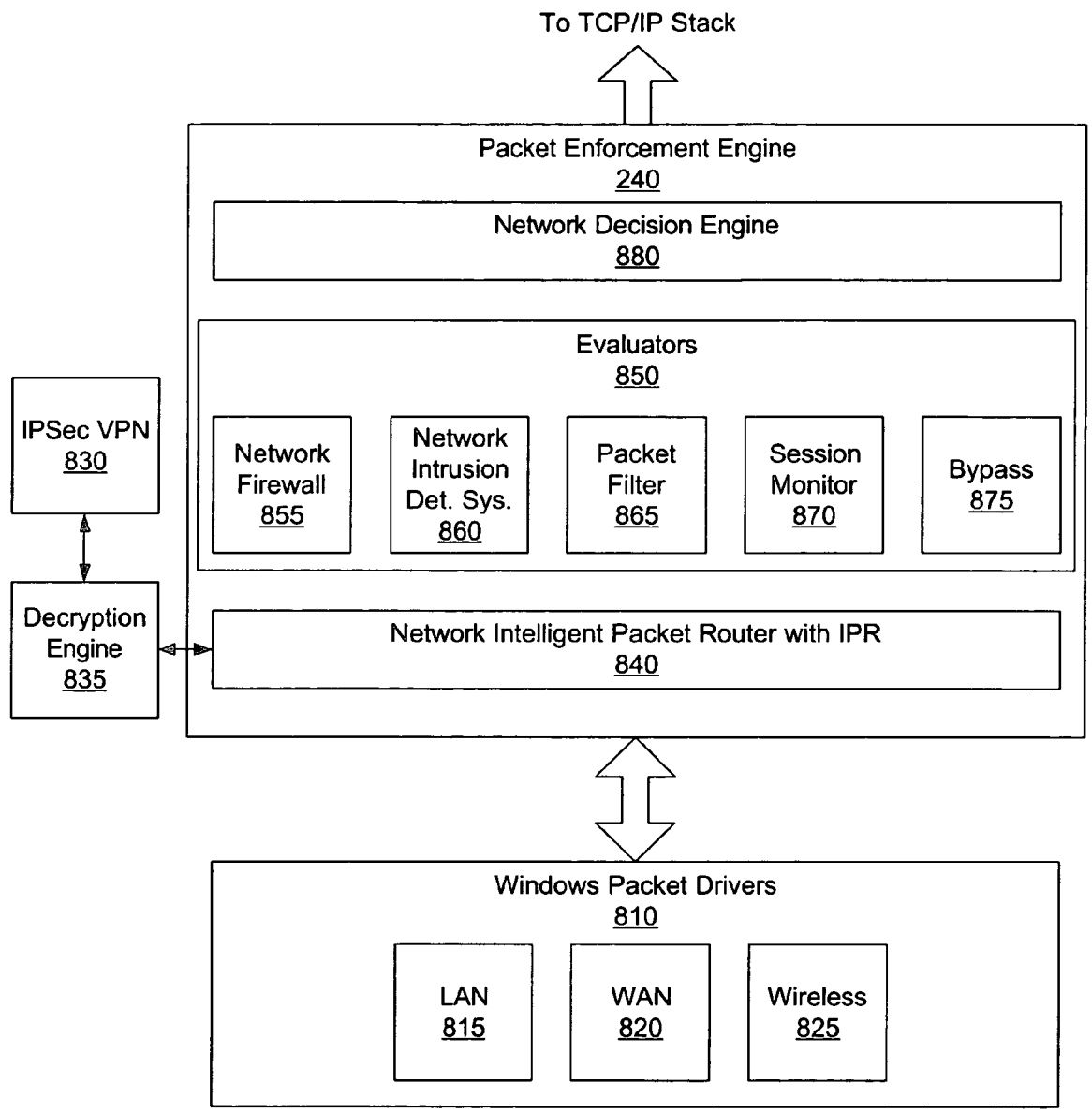
FIG. 8 is a block diagram of one embodiment of the packet enforcement engine of the security architecture.

FIG. 8 is a block diagram of one embodiment of the packet enforcement engine of the security architecture. The packet enforcement engine 240 receives packets from packet drivers external to the computer system, and sends packets from the computer system to packet drivers. For example, Windows packet drivers 810 include local area network (LAN) 815, wide area network (WAN) 820, Wireless 825, and other possible sources. In one embodiment, the packet enforcement engine 240 also handles packets from a virtual private network (VPN) connection 830. In one embodiment, packets from the VPN connection 830 are decrypted using decryption engine 835, and packets to the VPN are encrypted using the same engine 835. Once encrypted/decrypted, these packets are routed as normal packets through the packet enforcement engine 240. In this way, there does not need to be a separate authenticated path through the system.

Intelligent packet router 840, in packet enforcement engine 240, determines where the packet received should be routed. In one embodiment, the possible evaluators 850 which determine whether a packet is passed on to the TCP/IP stack include: a firewall 855, a network intrusion detection system (IDS) 860, a packet filter 865, a session monitor 870, and a pass-through path 875.

The firewall 855, in one embodiment, is a stateful inspection firewall engine. The firewall 855 examines each message and blocks those that do not meet the specified security criteria. In one embodiment, firewall 855 acts as a circuit-level gateway, applying security mechanisms when a TCP or UDP connection is established. Once the connection has been made, packets can flow between the hosts without further checking.

The Intrusion Detection system (IDS) 860 inspects all inbound and outbound network activity and identifies suspicious patterns that may indicate a network or system attack from someone attempting to break into or compromise a system.

The packet filter 865 looks at each packet entering or leaving the network and accepts or rejects it based on predefined rules. In one embodiment, packet filter 865 is part of firewall 855.

The session monitor 870 monitors the communication sessions to make sure that packets in each session have the correct sequence response (Syn, Ack etc) in the correct order, including the session's packet sequence numbers.

The bypass or pass-through 875 provides a way to pass through packets for established sessions that require no further monitoring. In one embodiment, the bypass 875 is only available for secured transmissions with trusted systems.

The network decision engine 880 receives any packets not discarded by the evaluators 850. The output of the network decision engine 880 is passed to the TCP/IP stack 210.

Figure 9A:
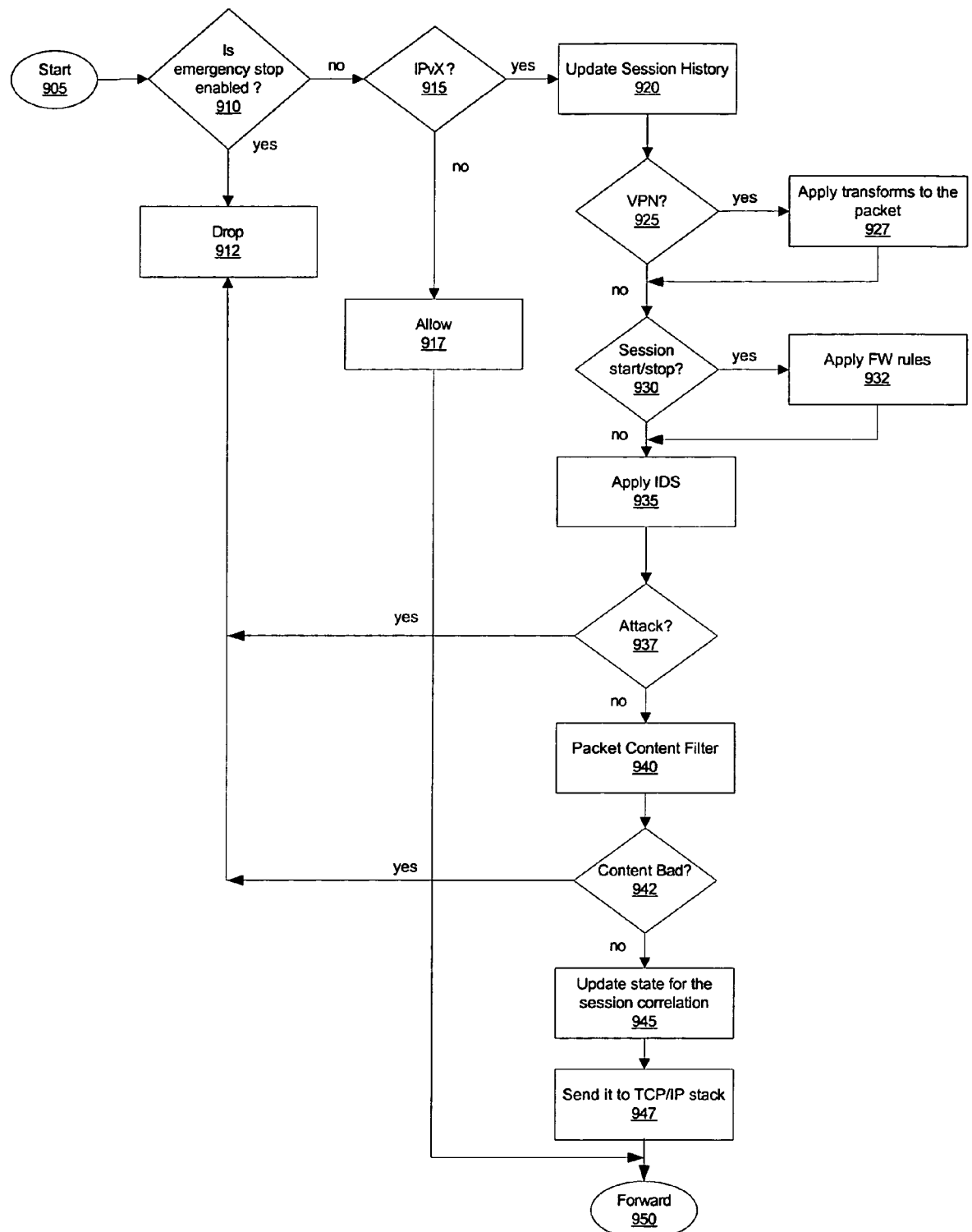
FIG. 9A is a flowchart of one embodiment of the packet filtering for incoming packets.

FIG. 9A is a flowchart of one embodiment of the packet filtering for incoming packets. The process starts at block 905, when a packet is received.

At block 910, the process tests whether an emergency stop is enabled. The emergency stop is enabled manually by a user or system administrator, if the user/administrator suspects a virus or other infection. It enables the simple disconnection of the computer system from the network, with an easy interface. If the emergency stop is enabled, the packet is dropped, at block 912. By dropping all packets, the system easily disables the network connection without requiring a physical disconnection. The process then ends. If the emergency stop is not enabled, the process continues to block 915.

At block 915, the process tests whether the packet is IPvX compliant. IPvX is Internet Protocol version X, i.e. any supported version. In one embodiment, IPv4 and IPv6 are supported. However, other IP versions may be supported as well. In one embodiment, if the packet is not of a supported type, the process, at block 917, allows the packet through, and ends. In another embodiment, if the packet is not of a supported type, it may be dropped.

If the packet is an IPvX compliant packet, the process continues to block 920. At block 920, the session history is updated, to include the packet currently being received.

At block 925, the process tests whether the packet is being sent over a virtual private network (VPN). VPN packets are generally encoded to provide security/privacy. If the packet is a VPN packet, at block 927 the transforms are applied to the packet to permit standard processing of the packet. In one embodiment, the transforms include decrypting the packet. The process then continues to block 930. If the packet is not a VPN packet, the process continues directly to block 930.

At block 930, the process determines whether the packet is a session start or session stop. If so, the firewall rules are applied at block 932. Otherwise, in one embodiment, the firewall is bypassed, speeding up processing by bypassing packets for established sessions.

At block 935, the IDS (intrusion detection system) rules are applied, to determine whether the packet is an attack on the user's system. If so, as determined at block 937, the packet is dropped, at block 912. If not, the process continues to block 940.

At block 940, the packet content filter is applied. The packet content filter permits only packets whose content complies with the IP packet specification. If the content is bad, as determined at block 942, the packet is dropped, at block 912. Otherwise, the state for the session correlation is updated at block 945, and the packet is sent to the TCP/IP stack at block 947. The packet is then forwarded, at block 950, to the next stage of processing.

Figure 9B:
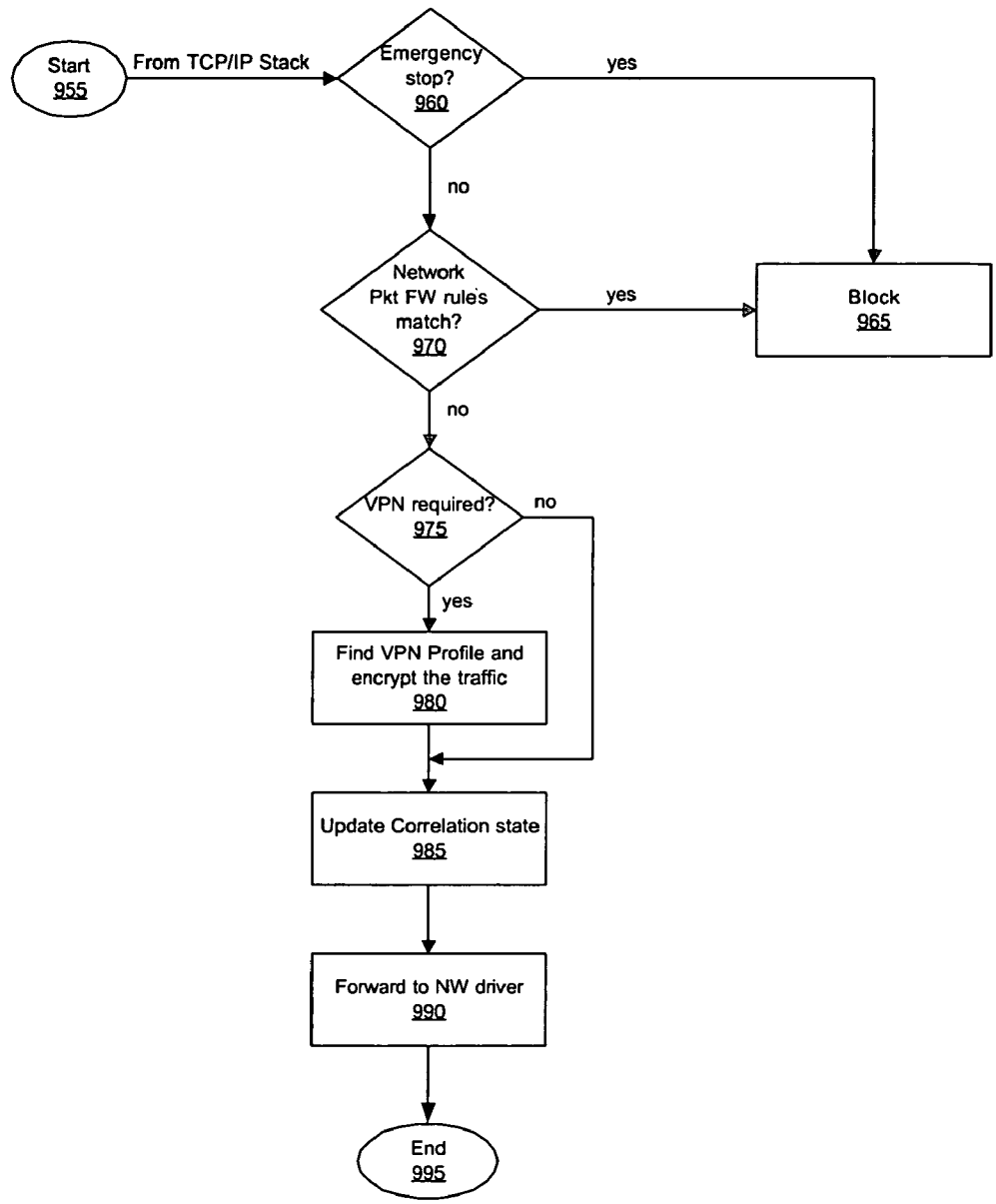
FIG. 9B is a flowchart of one embodiment of the packet filtering for outgoing packets.

FIG. 9B is a flowchart of one embodiment of the packet filtering for outgoing packets. The process starts at block 955, when a packet is received from the TCP/IP stack.

At block 960, the process determines whether the emergency stop is on. As discussed above, the emergency stop enables the user to simply block all incoming and outgoing traffic. This is useful by providing a simple user interface that enables sudden disconnection from the network, if a virus/worm/security problem is discovered, without requiring the unplugging of physical cables. If the emergency stop is on, the process, at block 965, blocks the packet, preventing it from entering the system. The process then terminates. Of course, this process is actually continuously monitoring packets as they come in. However, for simplicity, the present flowcharts illustrate an example of a single packet being received.

At block 970, if the emergency stop was not on, the process determines whether the network packet firewall rules match the packet. The firewall rules identify those packets that should not be permitted through the firewall. If the packet matches the rules—i.e. is identified as an unacceptable packet—the process continues to block 965, and blocks the packet. Otherwise, the process continues to block 975.

At block 975, the process determines whether a VPN is required for this transaction. If so, at block 980, the VPN profile is identified, and the packet is encrypted and/or otherwise transformed to meet the VPN profile. The process then continues to block 985. If the VPN is not required, the process continues directly to block 985.

At block 985, the correlation state is updated, and at block 990, the packet is forwarded to the network driver. The process then ends at block 995.

Figure 10:
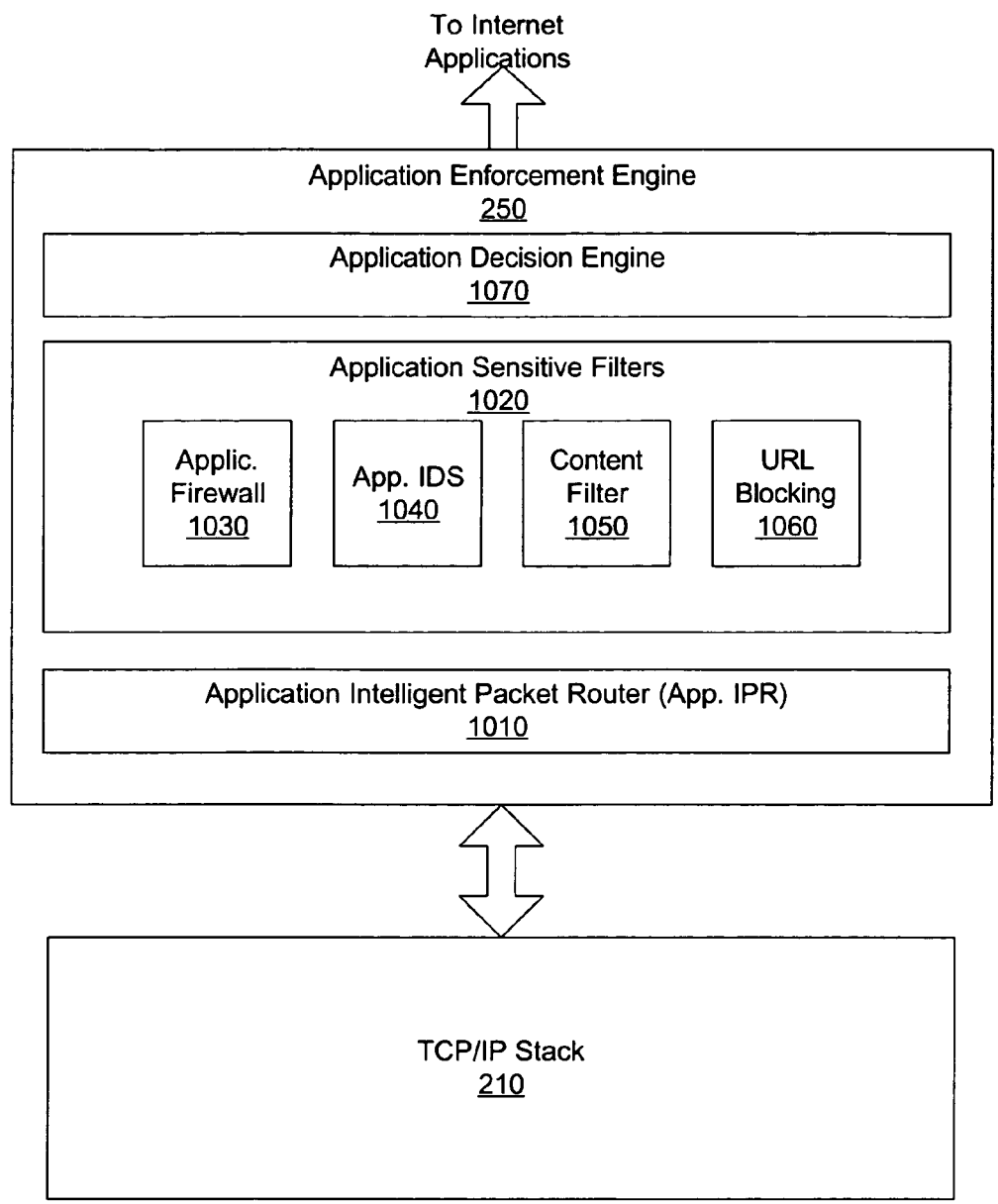
FIG. 10 is a block diagram of one embodiment of the application enforcement engine of the security architecture.

FIG. 10 is a block diagram of one embodiment of the application enforcement engine of the security architecture. The input to the application enforcement engine 230 is from the TCP/IP stack 210. The application intelligent packet router 1010 identifies each packet, and determines which of the Application sensitive filters 1020 route it to. The Application sensitive filters 1020 include application firewall 1030, application IDS 1040, content filter 1050, and URL blocking

1060. The application sensitive filters filter and react on content, related to an application or a specific protocol such as POP3, HTTP X.X.

The application decision engine 1070 receives the packets from the application sensitive filters 1020. The application decision engine 1070 supervises the correlation between communications and applications by making sure that requests to communicate match approved ports and protocols for the application, as well as linked to the correct application and path from where the application is started. The packets from the application decision engine 1070 are routed to the Internet applications 245.

Figure 11A:
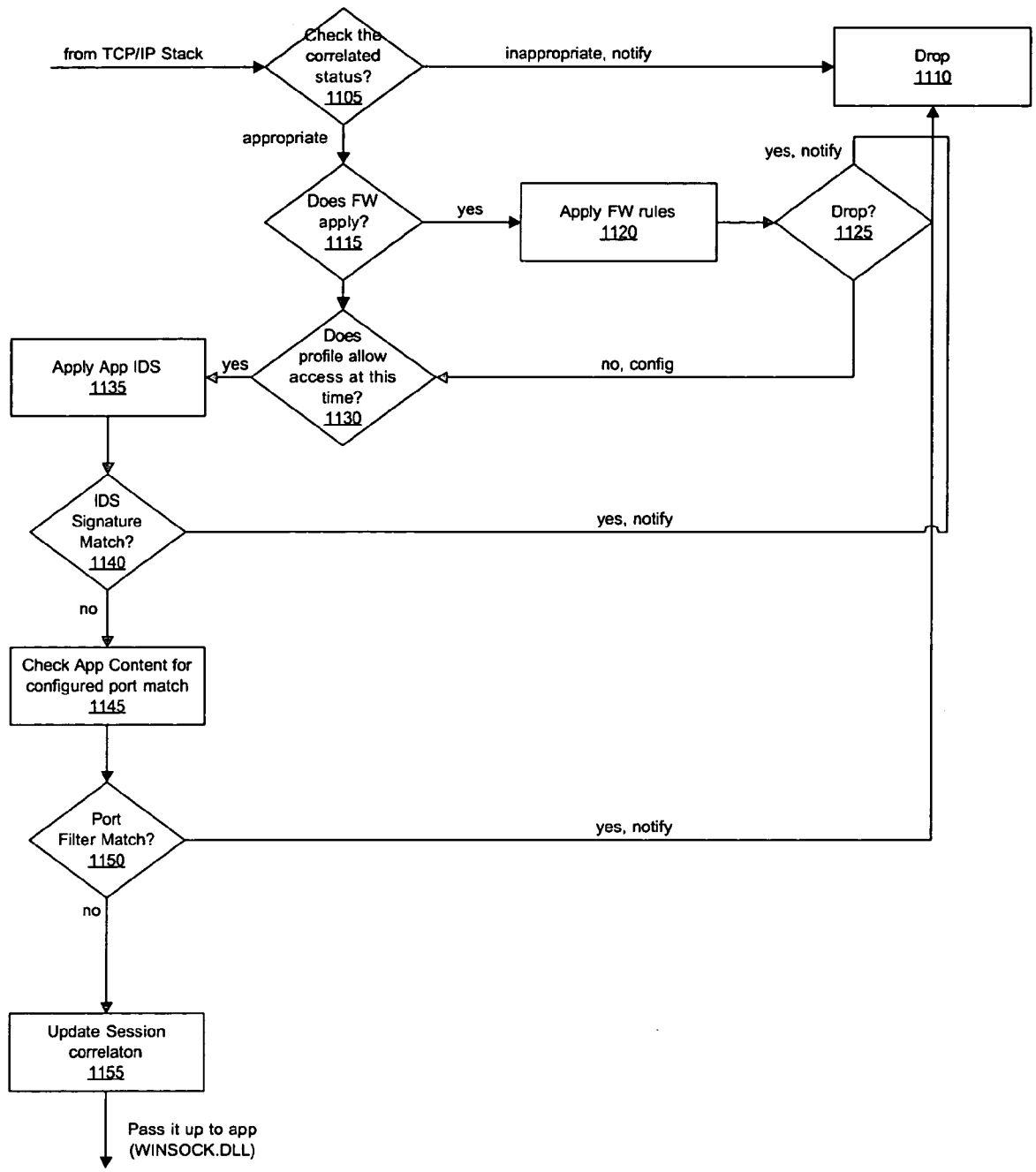
FIG. 11A is a flowchart of one embodiment of protocol filtering for incoming packets.

FIG. 11A is a flowchart of one embodiment of protocol filtering for incoming packets. The process starts when a packet is received from the TCP/IP stack. At block 1105, the correlated status is checked. The correlated status determines whether the packet is associated with one of the known & accepted applications running on the computer system. If the status is inappropriate, that is the packet appears to be addressed to an application that is not authorized to receive packets, the process continues to block 1110, and the packet is dropped. The process, for this packet, ends.

If the packet corresponds to an authorized application, the process continues to block 1115, where it determines whether the packet should go through the firewall. In one embodiment, only the initial packets are passed through the firewall. In one embodiment, once a session is established, further packets are not passed through the firewall to decrease the load on the system. If the firewall need not be used, the process continues to block 1130.

If the firewall is applicable, at block 1120, the process applies the firewall rules. Then, at block 1125, the process determines whether the packet should be dropped. Packets that do not meet the exclusion rules of the application firewall are dropped. The packet is dropped at block 1110. Otherwise, the process returns to block 1130, and configures the firewall to recognize that packets for this connection are acceptable in the future.

At block 1130, the process determines whether profile allows for access at this time. The system configuration may set up to prohibit access to applications based on user specific access configuration rules (profiles). If the profile prohibits, access, the process continues to block 1110, and drops the packet. Otherwise, the process continues to block 1135.

At block 1135, the application IDS (intrusion detection system) is applied, to determine whether the packet matches any of the signatures of intrusion (block 1140). If so, the process continues to block 1110 to drop the packet. Otherwise, the process continues to block 1145.

At block 1145, the process checks the application content for the configured port match. Most applications use a designated port, or set of ports. The process determines whether the port through which the packet came matches the designated ports for the application to which the packet is targeted. If there is a port filter match, as determined at block 1150, the process continues to block 1110, to drop the packet. Otherwise, the process continues to block 1155.

At block 1155, the session correlation is updated. The packet is then passed up to the application. In one embodiment, the packet is passed to the application through the Winsock DLL.

Figure 11B:
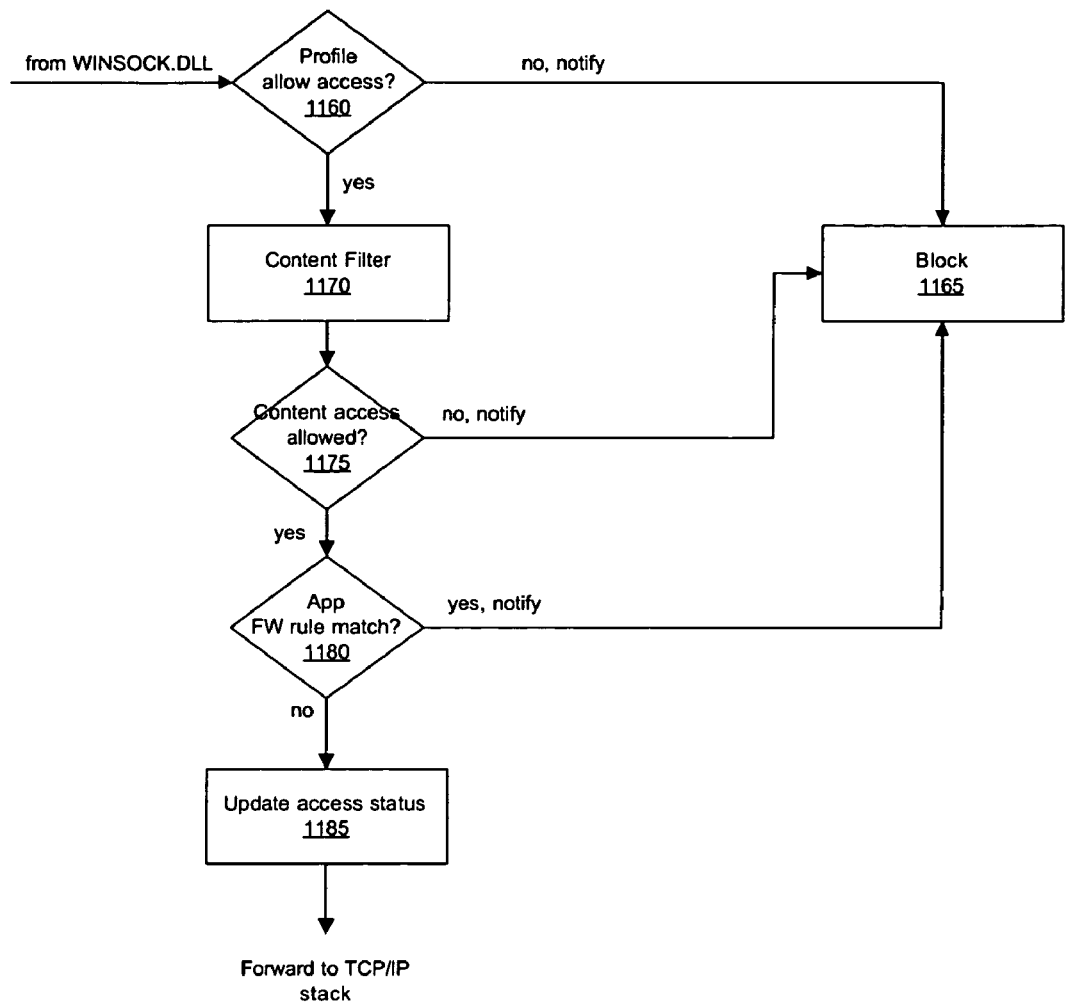
FIG. 11B is a flowchart of one embodiment of protocol filtering for outgoing packets.

FIG. 11B is a flowchart of one embodiment of protocol filtering for outgoing packets. The packet is received from the Winsock DLL, in one embodiment.

In one embodiment, if the packet is dropped, the system sends a notification. Depending on the configuration, a notification can create log entries and notify the user through a pop-up message on the screen. Furthermore if connected to a central system, alarming notifications can trigger an alert to a system administrator on the management system console.

At block 1160, the process determines whether the profile permits access. The application profile may prohibit access. If the profile does not allow access, the packet is blocked at block 1165. Otherwise, the process continues to block 1170.

At block 1170, the content filter is applied. In one embodiment, the content filter is used to remove content that is not acceptable, such as pornography, code for prohibited application types, attached files with matching filtered file extension types, etc. At block 1175, the process determines whether content access is allowed. If not, at block 1165, the content is blocked.

If the content filter passes the packet, the packet is compared to the firewall match rules. If it matches excluded packets, at block 1165, it is blocked. Otherwise, at block 1185, the access status is updated. The packet is then forwarded to the TCP/IP stack.

Figure 12:
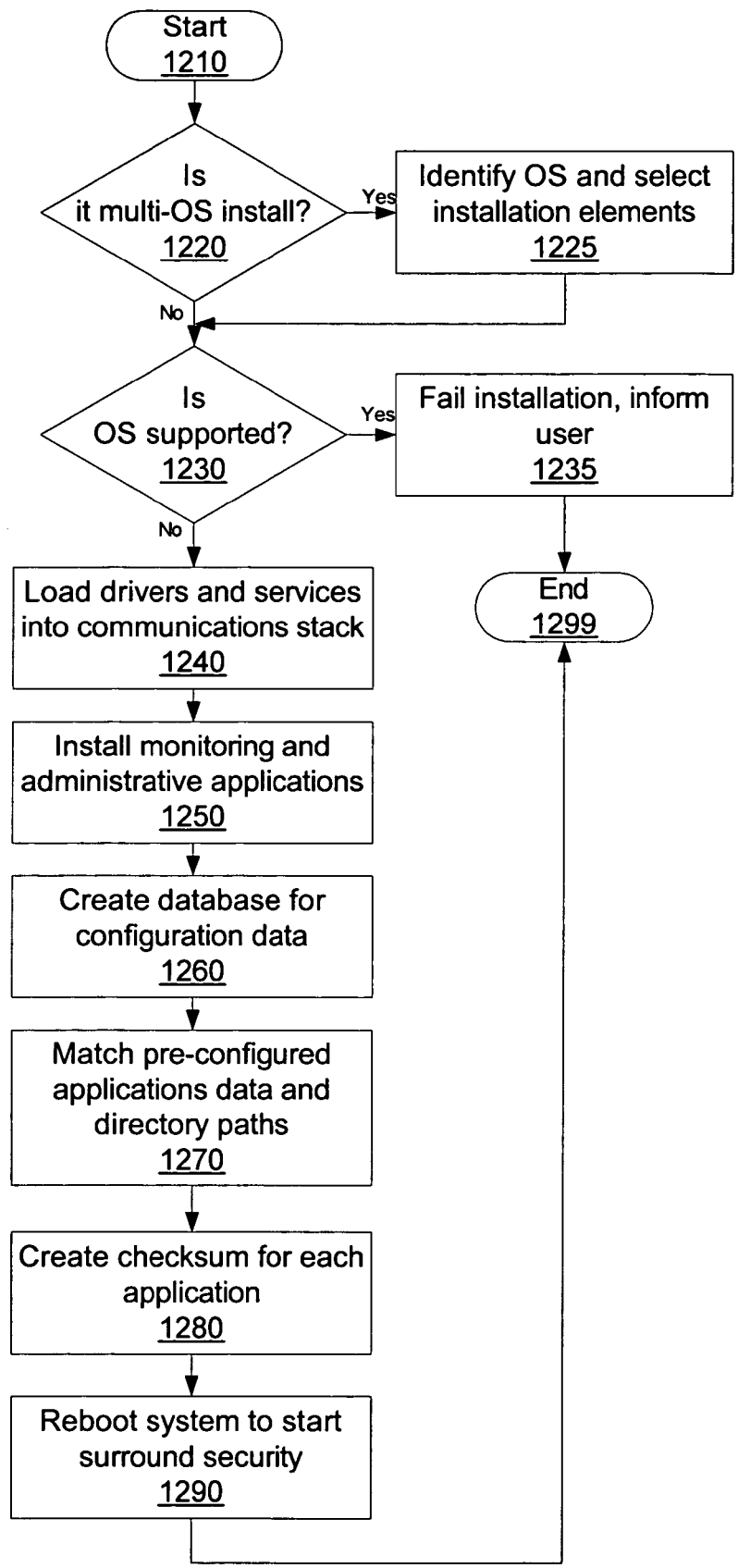
FIG. 12 is a flowchart of one embodiment of installing the security architecture in accordance with the present invention.

FIG. 12 is a flowchart of one embodiment of installing the security architecture in accordance with the present invention. The process starts at block 1210. At block 1220, the process determines if the installation file is a multi-operating system (OS) installation file. In one embodiment, the same installation executable contains a number of driver/services sets corresponding to the different OS supported. If so, the process continues to block 1225. At block 1225, the system identifies the type of OS that the installation will run on in order to pick the correct set of drivers, services, and applications to be installed. The process then continues to block 1230.

At block 1230, the process determines whether the operating system running on the system is supported. In one embodiment, if the installation executable is designated for a single OS, and this step verifies that the operating system is the correct one. If the OS is not supported, the process continues to block 1235, and the installation is failed. The user is informed, in one embodiment, that the OS is not supported by the current installation file. In one embodiment, the process determines if there is an installation file for the OS running on the system, and if so, advises the user to acquire the correct installation file. The process then ends at block 1299. If the OS is supported, the process continues to block 1240.

At block 1240, the communications related drivers and services are loaded at the appropriate places in the communication stack in order to provide the correct filtering at the appropriate levels.

At block 1250, the main monitoring and administration applications are then installed in the correct directory, and at block 1260, the system creates a database for storing configuration data securely. At block 1270, pre-configured applications data is matched up with the appropriate directory paths to the applications. At block 1280, a checksum—used for the application integrity when matching a communication stream with an application—is calculated for each configured application and stored securely. In one embodiment, the checksum is one way encrypted At block 1290, the system is rebooted so that installed drivers/services will be loaded at the appropriate places in the communication stack. The installation process is then considered complete, and the process ends at block 1299.

Figure 13:
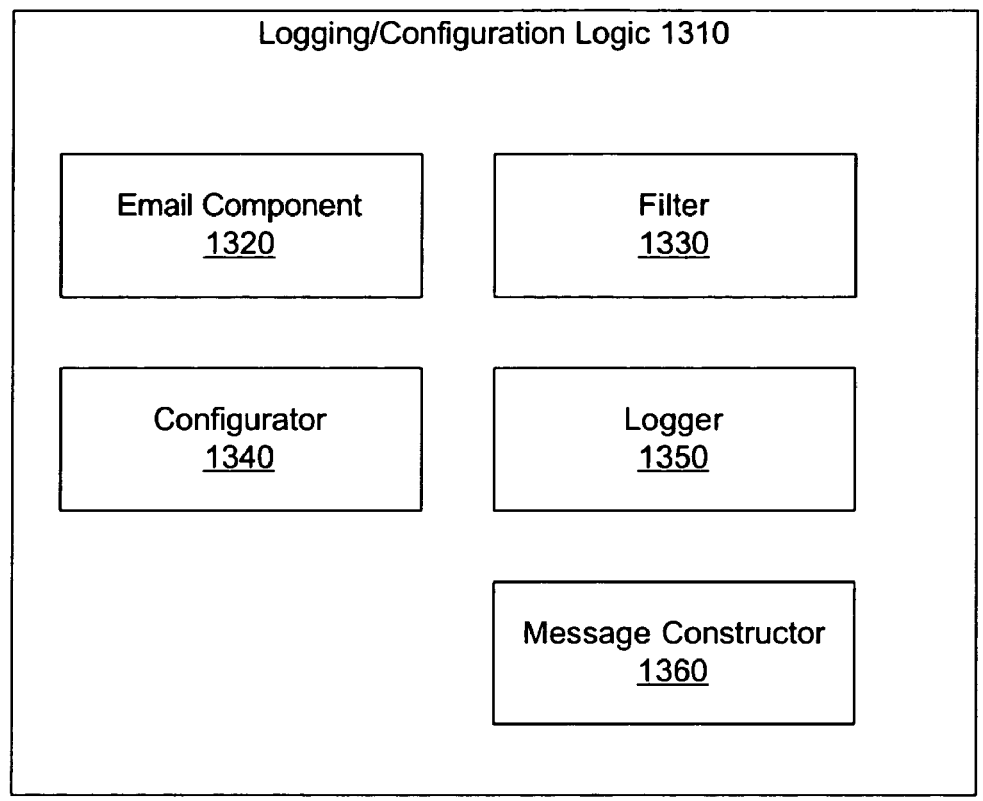
FIG. 13 is a block diagram of one embodiment of a logging and updating mechanism.

FIG. 13 is a block diagram for the logging/configuration logic. The logging/configuration logic uses an email system to configure the surround security system described above. The logging logic enables the system to send a log to a server. A store and forward system available everywhere makes it easier to ensure that clients who are not in immediate contact with the manager are properly configured, and will avoid problems like retires and keeping track of who is on line, if there are firewalls separating the connection etc. Email messages or instant messages (together referred to as messaging) are used as the way to centrally manage the surround security application. In one embodiment, this technique may be applied to managing other applications as well.

The client will receive configuration information and commands via messaging, and the client uses messaging to report logs as well as status information back to the central management system.

The command/configuration/feedback logic 1310, in one embodiment, includes an email component 1320. The email component 1320 is a separate mail client tied to the application on the computer itself. Having a separate email client tied to the application has several advantages. First it would not rely on the user to start checking mail. It will be independent of user's email client, and would have certain features that would make it compatible with the communication filtering techniques. A separate email client could be configured to automatically check for new mail and send mail when needed. Using the existing messaging infrastructure also has its advantages. It enables the system to make user configurations follow wherever the user logs in, as long as the known email address is used.

In one embodiment, the command/configuration/feedback logic 1310 includes a filter 1330, to filter email messages or instant messenger messages. In one embodiment, the filter uses the Application Enforcement Engine described above, to remove the packets directed toward the command/configuration/feedback logic 1310. In this way, the process is transparent to the user. In other words, even if the configuration messages are sent through the user's standard email program, or standard instant messenger application, it is removed before the user encounters it. In one embodiment, the emails are addressed to the person that owns the computer. In another embodiment, the configuration logic has a separate address associated with it.

Note that the messages sent to the client include configuration information, and may include commands such as shut down, export and send back logs, commands to go to an website and download newest release etc.

A configurator 1340 takes the message received through email component 1320 or obtained by filter 1330. The configurator 1340 then uses this data to configure the surround security system based on the information contained in the messages. As noted above, this technique may be used to manage other applications than the surround security system. One of skill in the art would understand how this technique may be used for updating any other application.

Logger 1350 maintains a log. In one embodiment, the information that is logged may be set by the administrator. For example, the log may only include the results of various scans, which patches were installed, and the like. In another embodiment, the logging may include additional details about the computer system. In one embodiment, the logging is restricted to the functionalities connected to the application coupled to the logging/configuring logic 1310. The term "log" includes, in this context alerts, status information, currently used configuration data, or any other data reported back to the server. Note that in one embodiment, the feature of logging may be present without the configuration feature described above, and vice versa.

Message constructor 1360 constructs a message with logging data to be sent back to the server. If a separate email client 1320 is used, the message is sent using the separate email client 1320. If the main messaging system (email or instant messaging) is used, when the user sends an email the system intercepts the traffic to the server and inserts a new message addressed to the management system containing logs or status information (or any other information requested by the central management system). This is done without the user having to know that it is happening in the background.

Figure 14:
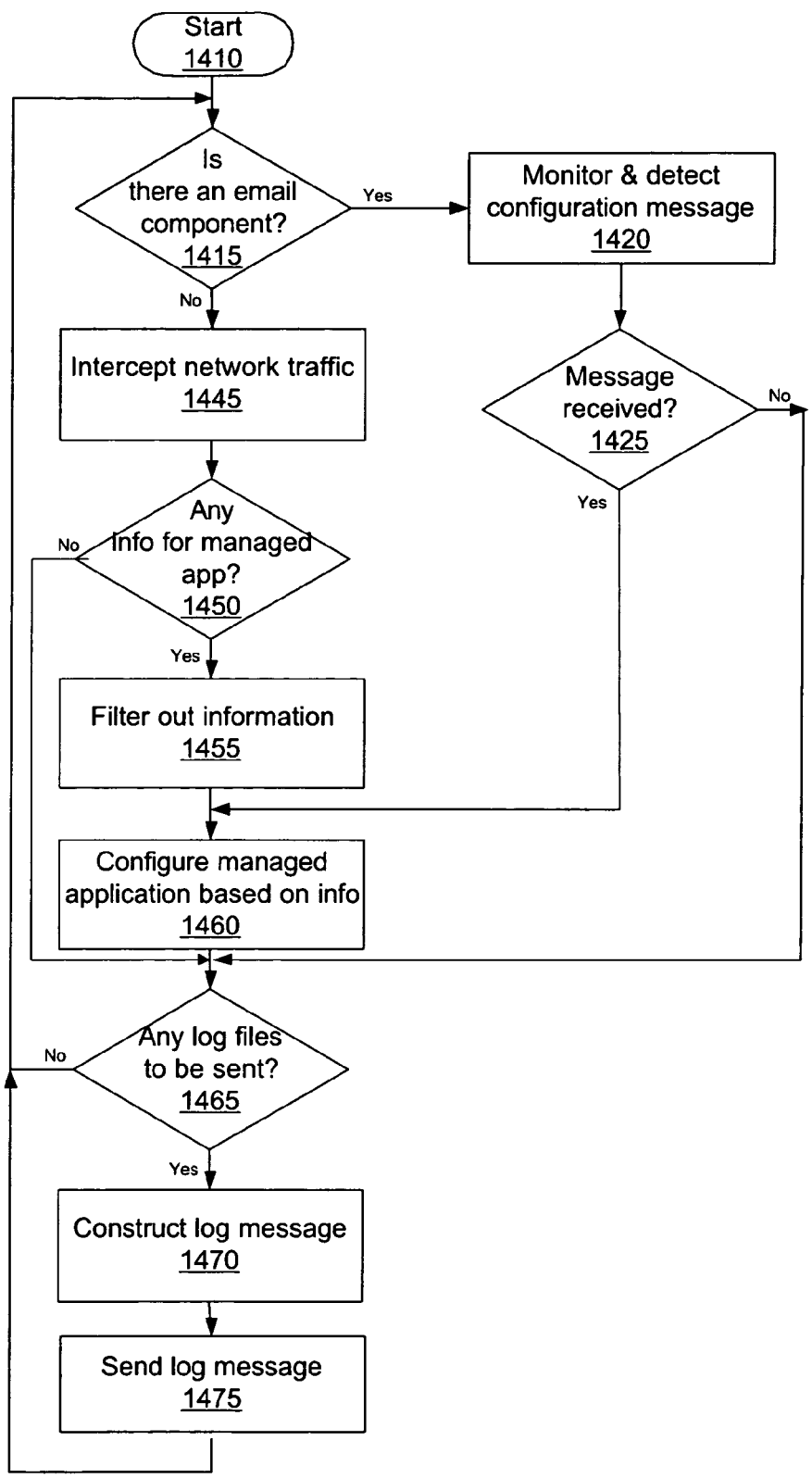
FIG. 14 is a flowchart of one embodiment of the updating/logging process from the perspective of the server.

FIG. 14 is a flowchart of one embodiment of the updating/logging process from the perspective of the client. The process starts at block 1410. At block 1415, the process determines whether there is an email component, or whether the system uses native messaging systems (email applications or instant messaging). If there is a dedicated email component, the process continues to block 1420.

At block 1420, the email component is monitored to detect if a configuration message is received. The email component is only used for configuration messages and the like, in one embodiment, so any message triggers the detection (block 1425). If a message is received, the process continues to block 1460. If no message is received, the process continues to block 1465.

If at block 1415, no email component was detected, the process continues to block 1445. At block 1445, the network traffic is intercepted. As described above, this is part of the surround security features available to the user.

At block 1450, the process determines whether the network traffic includes any information for the managed application. The information may be sent over a standard email application, via an instant messenger application, or via any similar path. If there is no information for the managed application, the process continues to block 1465. If there is information for the managed application, the process continues to block 1455.

At block 1455, the information for the managed application is filtered out. This means, in one embodiment, that the user never receives the management information in his or her email inbox. Rather, the packets are diverted before the email application encounters them. Similarly for instant messaging, the user would not see the message (which would appear as gibberish, in one embodiment.)

At block 1460, the managed application is configured based on the information received through the network traffic. In one embodiment, this is done transparently to the user. In another embodiment, this may require a reboot or similar action, so this may require user interaction (i.e. a pop-up to inform the user that a reboot is needed, and permitting the user to click OK or Cancel.) In one embodiment, since updating configuration may take computer resources, the user may be warned, and may be permitted to delay installation.

At block 1465 the process determines whether there are any log files to return to the server. If there are no log files, the process returns to block 1415, to restart the scan. If there are log files to be sent, the process continues to block 1470.

At block 1470, a log message is constructed. At block 1475, the log message is sent. If the system has an email component, the message is simply sent using the email component. If there is no email component, the network traffic to the server is intercepted, and the message is inserted, addressed to the management system. The process then returns to block 1415, to restart the scan.

Note that while this is illustrated in a flowchart form, as are other processes above and below, the actual implementation may use interrupts or similar mechanisms. In other words, the system may not use a monitoring mechanism, but rather may depend on an interrupt mechanism or the like to indicate when there is an incoming message to be processed or an outgoing message to be sent back to the management system.

Figure 15:
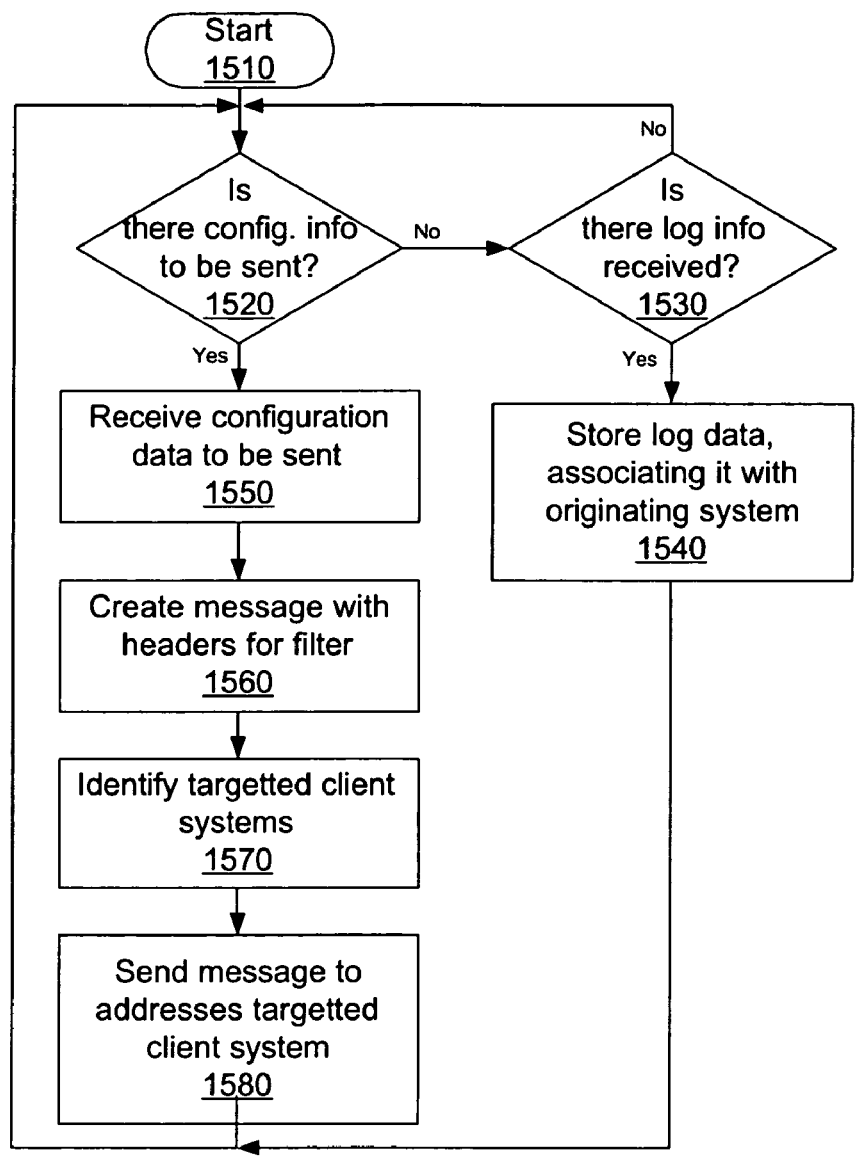
FIG. 15 is a flowchart of one embodiment of the updating/logging process from the perspective of the client.

FIG. 15 is a flowchart of one embodiment of the updating/logging process from the perspective of the server. The process starts at block 1510. At block 1520, the process determines whether there is configuration information to be sent. In one embodiment, an administrator may create a change in the configuration of the application, or otherwise indicate that the configuration of the application should be updated. If there is configuration information to be sent, the process continues to block 1550. If there is no configuration information to be sent, the process continues to block 1530. At block 1530, the process determines whether the server has received any log data. If no log data is received, the process returns to block 1520, to continue scanning. If log data has been received, it is stored. The log data, associated with the originating system, enables an administrator to see the current state of a user's system. In one embodiment, the log information is further used to determine whether a configuration change is needed for the computer system. In one embodiment, the system also makes the log information available to an administrator. The process then continues to block 1520, to continue scanning.

If there is configuration information to be sent at block 1520, the process continues to block 1550. At block 1550, configuration information to be sent to one or more users is received. At block 1560, the message is created. The message includes the alteration to the configuration data. In one embodiment, the message is essentially executable data, which when received by the client system can simply be executed to perform the requested alterations to the managed application.

At block 1570, the process determines which client systems should receive a copy of the message. In one embodiment, the administrator may name individual systems/users to whom the message should be sent. In another embodiment, the administrator may identify systems with a current configuration of a certain sort to receive the message. For example, the administrator may indicate that all users running Version 1.6 of Surround Security, on a Windows 98 system should receive the message update. The log information for each of the users is then used to identify which systems need to receive the configuration message.

At block 1580, the configuration message is sent to each of the targeted users. The process then returns to block 1520 to continue scanning.

Figure 16:
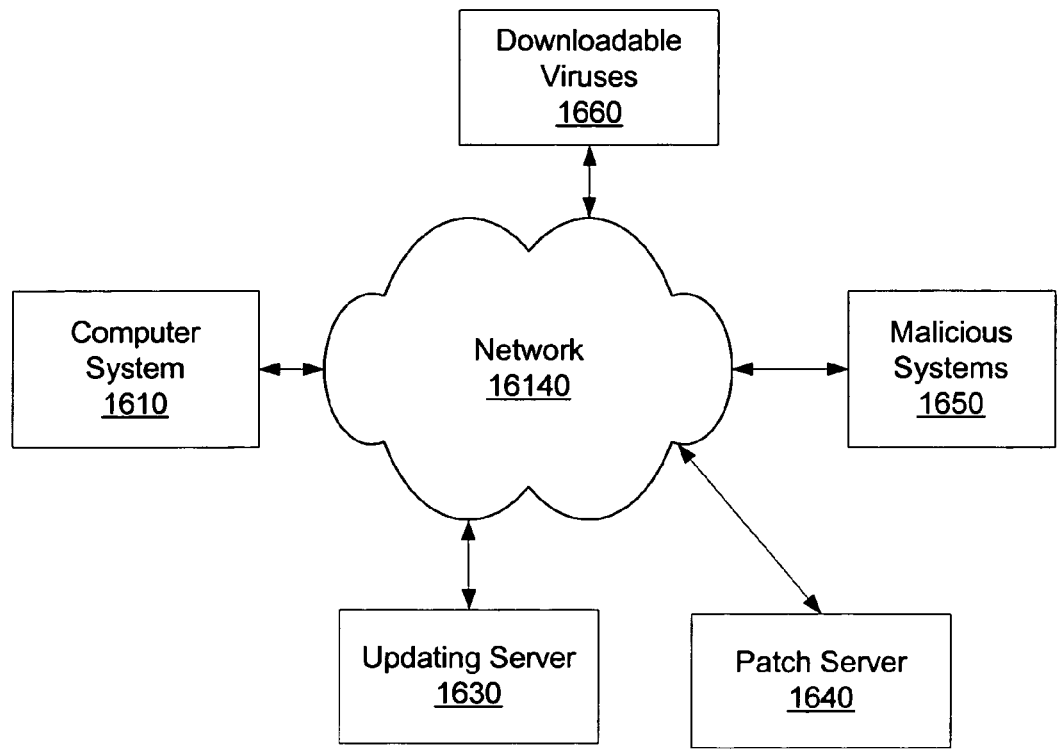
FIG. 16 is a block diagram of one embodiment of a network in which the present invention may be implemented.

FIG. 16 is a block diagram of one embodiment of a network in which the present invention may be implemented. The user's computer system 1610 is connected to the network 1620 to the external world, as well as to other computer systems. There are numerous threats that may attempt to access the computer system 1610 through network 1620, such as downloadable viruses 1660, malicious systems 1650, and other similar threats.

The present application includes software running on the user's computer system 1610, described above in detail, as well as an updating server 1630. The updating server 1630, in one embodiment, maintains a list of current state for applications that may be installed on the computer system 1610. The updating server 1630 may furthermore provide links to patch server 1640, if appropriate. Patch server 1640 may be the server maintained by a vendor, such as Microsoft, from which a patch for a vulnerability of bug may be downloaded. Upon receiving the link to the patch server 1640, the user on computer system 1610 may download the patch directly from patch server 1640, ensuring that only the application vendor authorized patches are available to the user.

Figure 17:
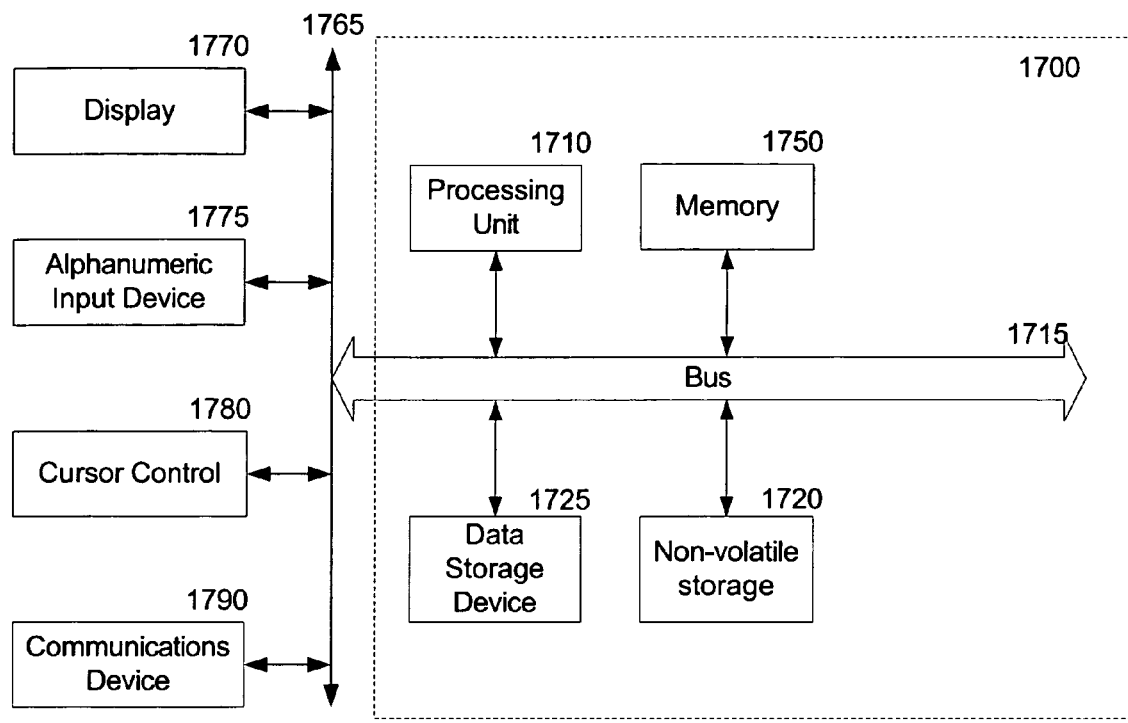
FIG. 17 is a block diagram of one embodiment of a computer system on which the present invention may be implemented.

FIG. 17 is one embodiment of a computer system that may be used with the present invention. It will be apparent to those of ordinary skill in the art, however that other alternative systems of various system architectures may also be used.

The data processing system illustrated in FIG. 17 includes a bus or other internal communication means 1715 for communicating information, and a processor 1710 coupled to the bus 1715 for processing information. The system further comprises a random access memory (RAM) or other volatile storage device 1750 (referred to as memory), coupled to bus 1715 for storing information and instructions to be executed by processor 1710. Main memory 1750 also may be used for storing temporary variables or other intermediate information during execution of instructions by processor 1710. The system also comprises a read only memory (ROM) and/or static storage device 1720 coupled to bus 1715 for storing static information and instructions for processor 1710, and a data storage device 1725 such as a magnetic disk or optical disk and its corresponding disk drive. Data storage device 1725 is coupled to bus 1715 for storing information and instructions.

The system may further be coupled to a display device 1770, such as a cathode ray tube (CRT) or a liquid crystal display (LCD) coupled to bus 1715 through bus 1765 for displaying information to a computer user. An alphanumeric input device 1775, including alphanumeric and other keys, may also be coupled to bus 1715 through bus 1765 for communicating information and command selections to processor 1710. An additional user input device is cursor control device 1780, such as a mouse, a trackball, stylus, or cursor direction keys coupled to bus 1715 through bus 1765 for communicating direction information and command selections to processor 1710, and for controlling cursor movement on display device 1770.

Another device, which may optionally be coupled to computer system 1700, is a communication device 1790 for accessing other nodes of a distributed system via a network. The communication device 1790 may include any of a number of commercially available networking peripheral devices such as those used for coupling to an Ethernet, token ring, Internet, or wide area network. The communication device 1790 may further be a null-modem connection, or any other mechanism that provides connectivity between the computer system 1700 and the outside world. Note that any or all of the components of this system illustrated in FIG. 17 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1750, mass storage device 1725, or other storage medium locally or remotely accessible to processor 1710.

It will be apparent to those of ordinary skill in the art that the system, method, and process described herein can be implemented as software stored in main memory 1750 or read only memory 1720 and executed by processor 1710. This control logic or software may also be resident on an article of manufacture comprising a computer readable medium having computer readable program code embodied therein and being readable by the mass storage device 1725 and for causing the processor 1710 to operate in accordance with the methods and teachings herein.

The present invention may also be embodied in a handheld or portable device containing a subset of the computer hardware components described above. For example, the handheld device may be configured to contain only the bus 1715, the processor 1710, and memory 1750 and/or 1725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1710, a data storage device 1725, a bus 1715, and memory 1750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A surround security system embodied on a tangible and non-transitory computer readable storage medium including instructions executable by a processor associated with a computer system, the surround security system comprising:
   a packet enforcement engine to screen packets, using at least one of a plurality of packet enforcement evaluators comprising a network firewall, a network intrusion detection system, a packet filter, and a session monitor, to and from a network and a TCP/IP stack of the computer system and to transmit acceptable packets to and from the network and the TCP/IP stack;
   an application enforcement engine to screen packets, using at least one of a plurality of application enforcement evaluators comprising an application firewall, an application intrusion detection system, a content filter, and a URL blocking engine, to and from the TCP/IP stack and an applications programming interface on the computer system and to transmit acceptable packets to and from the TCP/IP stack and applications;
   a smart packet forwarder integrally coupled with both the packet enforcement engine and the application enforcement engine to forward only the acceptable packets through the TCP/IP stack to the application programming interface or network;
   wherein the smart packet forwarder is configured to determine which of the plurality of packet enforcement evaluators and application enforcement evaluators should evaluate a packet;
   the plurality of packet enforcement evaluators and application enforcement evaluators evaluate the packet and discard the packet if the packet meets certain criteria;
   an application controller integrally coupled to the smart packet forwarder to prohibit certain applications from running based on the results of the packets screened by the packet enforcement engine and the application enforcement engine;
   a file monitor to verify integrity of operating system files on the computer system; and
   a vulnerability scanner to ensure that, the operating system installed on the computer system complies with a set level of security;
   the surround security system providing security which protects accesses through the TCP/IP stack for applications, and operating system of the computer system;
   wherein the packet enforcement engine, application enforcement engine, file monitor and vulnerability scanner are configured to operate at one or more layers below an applications layer of the computer system.

2. The surround security system of claim 1, wherein the vulnerability scanner comprises:
   a profile including identification of versions of various applications on the computer system;
   a server interactor to use the profile to obtain relevant patches from a remote server; and
   a patch installation logic to install the relevant patches.

3. The surround security system of claim 2, wherein the profile includes identification of an operating system version.

4. The surround security system of claim 2, wherein the profile includes a list of installed patches.

5. The surround security system of claim 2, wherein the vulnerability scanner is triggered periodically.

6. The surround security system of claim 5, wherein the vulnerability scanner is triggered by one or more of the following:
   a preset period having elapsed, rebooting the computer system, connection of the computer system to a network, or installation of a new application.

7. The surround security system of claim 1, wherein the vulnerability scanner comprises:
   a settings vulnerability scanner to ensure that a password and other settings on the computer system comply with preset security levels.

8. The surround security system of claim 7, wherein the preset security levels indicate a length of an acceptable password and a frequency to change the password.

9. The surround security system of claim 1, wherein the file monitor comprises:
   a real time monitor to monitor active files and processes; and
   a periodic monitor to ensure that the computer system files have not been maliciously altered.

10. The surround security system of claim 9, wherein the real time monitor monitors one or more of the following:
    memory use, CPU use, process spawning, active executable files, and active DLL files.

11. The surround security system of claim 9, wherein the periodic monitor monitors one or more of the following:
registry, versions of DLL files, executables, and other files.

12. The surround security system of claim 1, further comprising:
a file encryption module to provide additional security by enabling encryption of files including application files.

13. The surround security system of claim 1, wherein the packet enforcement engine comprises:
an intelligent packet router to determine which of a plurality of evaluators should evaluate a packet; and
the plurality of evaluators to evaluate the packet and discard the packet if the packet meets certain criteria.

14. The surround security system of claim 13, wherein the packet enforcement engine further comprises:
an encryption engine to encrypt and decrypt packets for sending over a virtual private network (VPN), the encryption engine coupled to the packet router.

15. The surround security system of claim 13, wherein the evaluators comprise one or more of the following:
a network firewall, a network intrusion detection system, a packet filter, and a session monitor.

16. The surround security system of claim 13, wherein the evaluator further comprises a bypass, the bypass to permit packets associated with an established and verified session to bypass the evaluators.

17. The surround security system of claim 1, wherein the application enforcement engine comprises:
an application intelligent packet router to route packets to one of a plurality of Application sensitive filters;
a plurality of Application sensitive filters to discard packets that meet particular criteria.

18. The surround security system of claim 17, wherein the Application sensitive filters comprise one or more of the following: an application firewall, an application intrusion detection system, a content filter, and a URL blocking engine.

19. The surround security system of claim 1, further comprising:
a command/configuration/feedback logic to use a messaging system to send configuration information to the surround security system.

20. The surround security system of claim 19, wherein the messaging system comprises one of the following:
an email component of the surround security system, an email application, and an instant messaging application.

21. The surround security system of claim 20, further comprising:
a filter to filter out messages including the configuration information, such that the configuration information is transmitted transparently to the user.

22. The surround security system of claim 19, further comprising:
a message constructor to construct a message including log data, and return the message to a server.

23. The surround security system of claim 22, wherein the message constructor is further configured to intercept traffic to the server and insert a new message containing the logs.

24. The surround security system of claim 22, wherein the logs comprise one or more of the following:
status information, alerts, status, currently used configuration data, and other information requested by the management system.

25. A method of implementing a surround security system of claim 1 comprising:
scanning packets between the network and the TCP/IP stack for security;
scanning packets between the TCP/IP stack of the computer system and the operating system and applications of the computer system for security, to permit only accepted applications to access the network, the accepted applications derived by:
recording use of the computer system during a period, and permitting only those applications that were indicated as acceptable during the period to access the network.

* * * * *